(12) United States Patent
Hirai et al.

(10) Patent No.: US 6,301,023 B1
(45) Date of Patent: Oct. 9, 2001

(54) IMAGE FORMING APPARATUS

(75) Inventors: Masashi Hirai, Katano; Hidekazu Sakagami, Sakurai; Syoichiro Yoshiura, Tenri; Osamu Nakayama, Nara; Fumio Shimazu, Nara; Noritaka Okazaki, Nara, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/243,923

(22) Filed: Feb. 3, 1999

(30) Foreign Application Priority Data

Feb. 3, 1998 (JP) .................................... 10-022405

(51) Int. Cl.⁷ .................................................... H04N 1/04
(52) U.S. Cl. ........................ 358/498; 399/162; 346/139 A
(58) Field of Search ............................. 358/498; 399/162, 399/319; 346/139 A

(56) References Cited

U.S. PATENT DOCUMENTS

| 4,417,260 | * | 11/1983 | Kawai | 346/160 |
| 6,094,560 | * | 7/2000 | Thomas | 399/341 |

FOREIGN PATENT DOCUMENTS

| 63066578 | | 2/1988 | (JP) | G03G/15/01 |
| 63279280 | | 11/1988 | (JP) | G03G/15/01 |
| 04097186 | * | 3/1992 | (JP) | G03G/15/16 |
| 06008511 | | 1/1994 | (JP) | G03G/15/01 |
| 08305223 | * | 11/1996 | (JP) | G03G/21/00 |

* cited by examiner

Primary Examiner—Jerome Grant
(74) Attorney, Agent, or Firm—David G. Conlin; George W. Neuner; Dike, Bronstein, Roberts and Cushman

(57) ABSTRACT

In an image forming apparatus including a transfer and transport belt suspended between a plurality of rollers, an image forming section for forming a pattern image on the transfer and transport belt, and a pattern image detecting sensor for detecting the pattern image, the pattern image detecting sensor is disposed so as to detect the surface of a suspended segment, of the transfer and transport belt, suspended between the rollers, and a back surface contact member that is in contact with a back surface of a detection area where the pattern image detecting sensor detects the pattern image on the surface of the transfer and transport belt is provided so as to render the detection area flat and stable. This can provide an image forming apparatus incorporating a pattern image detecting means having a simple arrangement and a capability to surely detect the pattern image in a precise and stable manner.

16 Claims, 20 Drawing Sheets

IMAGE FORMING APPARATUS

FIELD OF THE INVENTION

The present invention relates to an image forming apparatus incorporating image forming means for forming a pattern image on an endless belt suspended by a plurality of support members and pattern image detecting means for detecting the pattern image, and in particular to an image forming apparatus incorporating, in addition to such image forming means and pattern image detecting means, image forming condition control means for controlling conditions for forming an image on a recording medium carried by the endless belt thereon according to results of detection conducted by the pattern image detecting means.

Moreover, the present invention relates to an image forming apparatus that is suitably used in a color digital copying machine for, first, collecting color-separated image information of an original document by separating and reading colors of the image of the original document, and thereafter, reproducing the image of the original document in color according to the color-separated image information.

BACKGROUND OF THE INVENTION

A color image forming apparatus forms a color image by superimposing images of different colors on a sheet-like recording medium, for example a print paper. A color digital copying machine, for instance, reproduces an original color image by performing predetermined image processing on a color-separated image of an original document input through a scanner, forming a color-separated image of each color in an image forming section, and superimposing those images of different colors on a recording medium.

The color digital copying machine can faithfully reproduce the color image expressed in an original color document without distorting it, by faithfully reproducing the images of different colors and precisely superimposing those images of different colors on the recording medium.

For these reasons, to produce an image more faithfully to the original image, a color image forming apparatus has been developed lately which incorporates a process control unit for controlling image forming conditions in an image forming process to ensure faithful color reproduction in the image forming process for each color and which also incorporates a registration control unit for controlling the timing of image forming to precisely superimpose the images of different colors on a recording medium. Color copying machines have already been commercialised incorporating such a color image forming apparatus.

Japanese Laid-Open Patent Application No. 63-66578/1988 (Tokukaisho 63-66578) and Japanese Laid-Open Patent Application No. 63-279280/1988 (Tokukaisho 63-279280), among others, disclose technologies for a process control unit and registration control unit of this kind.

Japanese Laid-Open Patent Application No. 63-66578/1988 (Tokukaisho 63-66578) discusses control technologies for adjusting the image recording starting position on a transfer belt. Meanwhile, Japanese Laid-Open Patent Application No. 63-279280/1988 (Tokukaisho 63-27980) discusses control technologies for correcting the relative displacement of the images of different colors and for adjusting image density in a recording device for each color.

According to the technologies disclosed in those Patent Applications, the position and density of the pattern image formed on a transport belt is detected by a sensor, and then controlled in a suitable manner according to the signal output from the sensor.

A color image forming apparatus disclosed in Japanese Laid-Open Patent Application No. 63-66578/1988 (Tokukaisho 63-66578) is arranged so that a displacement of an image recording starting position is detected on a transport belt by forming, using a recording device, a pattern image on the transport belt at a predetermined timing and reading the pattern image with a CCD (Charge Coupled Device). Subsequently, an image writing forming timing is corrected in a recording device by an image writing timing correcting circuit, which acts as a registration control unit, according to the detected amount of displacement.

An image forming apparatus disclosed in Japanese Laid-Open Patent Application No. 63-279280/1988 (Tokukaisho 63-27980) is arranged so that a displacement of an image is detected by transferring a pattern image visualised by a recording device for each color onto a transfer belt and measuring an interval between the pattern images transferred onto the transfer belt. Subsequently, a writing timing is changed in a recording device by a CPU (Central Processing Unit), which acts as a registration control unit, according to the detected amount of displacement.

The above image forming apparatus is further arranged so that the density of the pattern image for image density detection transferred onto the transfer belt is measured by a photosensor, and the CPU controls toner supply in the recording device according to the measured density of the pattern image.

Nevertheless, faithful color image reproduction is not an easy task even to a color image forming apparatus for performing a process control and registration control of this kind. One reason for that is the problem in the precision in detecting a pattern image by nothing else but the sensor for detecting the pattern image. Conventionally, in order to improve the precision in detection, a sensor has been selected with good characteristics and improvements have been made on a circuit for processing detection signals.

However, such modifications of the sensor as such still fail to address the variation in the output of detection signals from the sensor caused by the variation in placement conditions, such as distance and angle, of the sensor with respect to the pattern image, and cannot avoid resulting in a poor precision in detection. For these reasons, in order to improve the precision in detection by the sensor, improvement should be made on the installment of the sensor in relation to the detected object (pattern image).

Moving back to the Patent Applications mentioned above to see how the sensor is installed, a CCD as a sensor is disposed opposite to a planar segment of a transport belt suspended by a plurality of rollers in Japanese Laid-Open Patent Application No. 63-66578/1988 (Tokukaisho 63-66578), whilst a photosensor is disposed opposite to a belt drive roller for suspending and supporting a transfer belt in Japanese Laid-Open Patent Application No. 63-279280/1988 (Tokukaisho 63-27980).

However, in the Patent Applications mentioned above, no consideration is given to the manner how the sensor is installed to improve the precision in detecting a pattern image by the sensor. Simply disposing a sensor for detecting a mark on the surface of a transport belt opposite thereto in the above manners cannot realise faithful color image reproduction.

If a sensor is simply disposed opposite to a planar segment of a transport belt suspended by a plurality of rollers as disclosed in Japanese Laid-Open Patent Application No. 63-66578/1988 (Tokukaisho 63-66578), the distance between the sensor and the transport belt inevitably changes due to the vibration of the suspended transport belt and also due to displacement in the installment of the sensor.

Meanwhile, if a photosensor is disposed opposite to a belt drive roller for suspending and supporting a transfer belt as disclosed in Japanese Laid-Open Patent Application No. 63-279280/1988 (Tokukaisho 63-27980), the pattern image is detected when it is on a surface of a segment, of the transport belt, that has curved due to the round surface of the roller for the transport belt. Therefore the inclination of the optic axis of the sensor to the surface of the transport belt tends to vary, and the sensor output tends to change.

The rotation axis of the roller is eccentric in some cases, causing the roller to rotate elliptically rather than rotate circularly. As a result, the distance between the sensor and transport belt changes according to the location of the roller.

As illustrated in the above description, if no consideration is given to the manner how the sensor is disposed, the sensor output changes due to various reasons.

SUMMARY OF THE INVENTION

In view of the problems, an object of the present invention is to provide an image forming apparatus incorporating simply arranged pattern image detecting means that can surely detect a pattern image in a precise and stable manner. Another object of the present invention is to provide a color image forming apparatus incorporating simply arranged image forming condition control means that can surely perform registration control and process control in a precise and stable manner.

In order to accomplish the objects, the image forming apparatus in accordance with the present invention includes:

an endless belt moving in a predetermined direction, a pattern image being formed on the endless belt;

pattern image reading means for reading the pattern image; and reading stabilizing means, provided in contact with a back surface of the endless belt and including a back surface contact member for causing an area in which the pattern image is formed to be substantially flat when the pattern image reading means reads the pattern image, for maintaining the relative positions of the back surface contact member and the pattern image reading means in a predetermined state.

With the arrangement, the endless belt moves in a predetermined direction. The pattern image formed on the surface of the endless belt is read by the pattern image reading means when transported to a position where the pattern image reading means is disposed. Here, since the back surface contact member is in contact with the back surface of the endless belt, the area in which the pattern image is formed becomes substantially flat. Reading operation is far more stable on the substantially flat area than on a non-flat area.

Nevertheless, even when the area in which the pattern image is formed is substantially flat, if the endless belt quivers (e.g. in a vertical direction to the surface of the endless belt), the substantially flat area also quivers accordingly. The quiver negatively affects results of the reading operation, rendering precise and stable reading operation impossible.

Therefore, the image forming apparatus is arranged so that the reading stabilizing means always maintains the relative positions of the back surface contact member and the pattern image reading means in a predetermined state, and enables the pattern image to be always read in a precise and stable manner despite such possible quiver of the endless belt. Even if the endless belt quivers as above, since the relative positions of the back surface contact member and the pattern image reading means are maintained in a predetermined state, the quiver no longer negatively affects results of the reading operation.

For a fuller understanding of the nature and advantages of the invention, reference should be made to the ensuing detailed description taken in conjunction with the accompanying drawings.

DESCRIPTION OF THE EMBODIMENTS

[Embodiment 1]

Referring to FIGS. 1 through 7, the following description will discuss an embodiment in accordance with the present invention.

Figure 2:
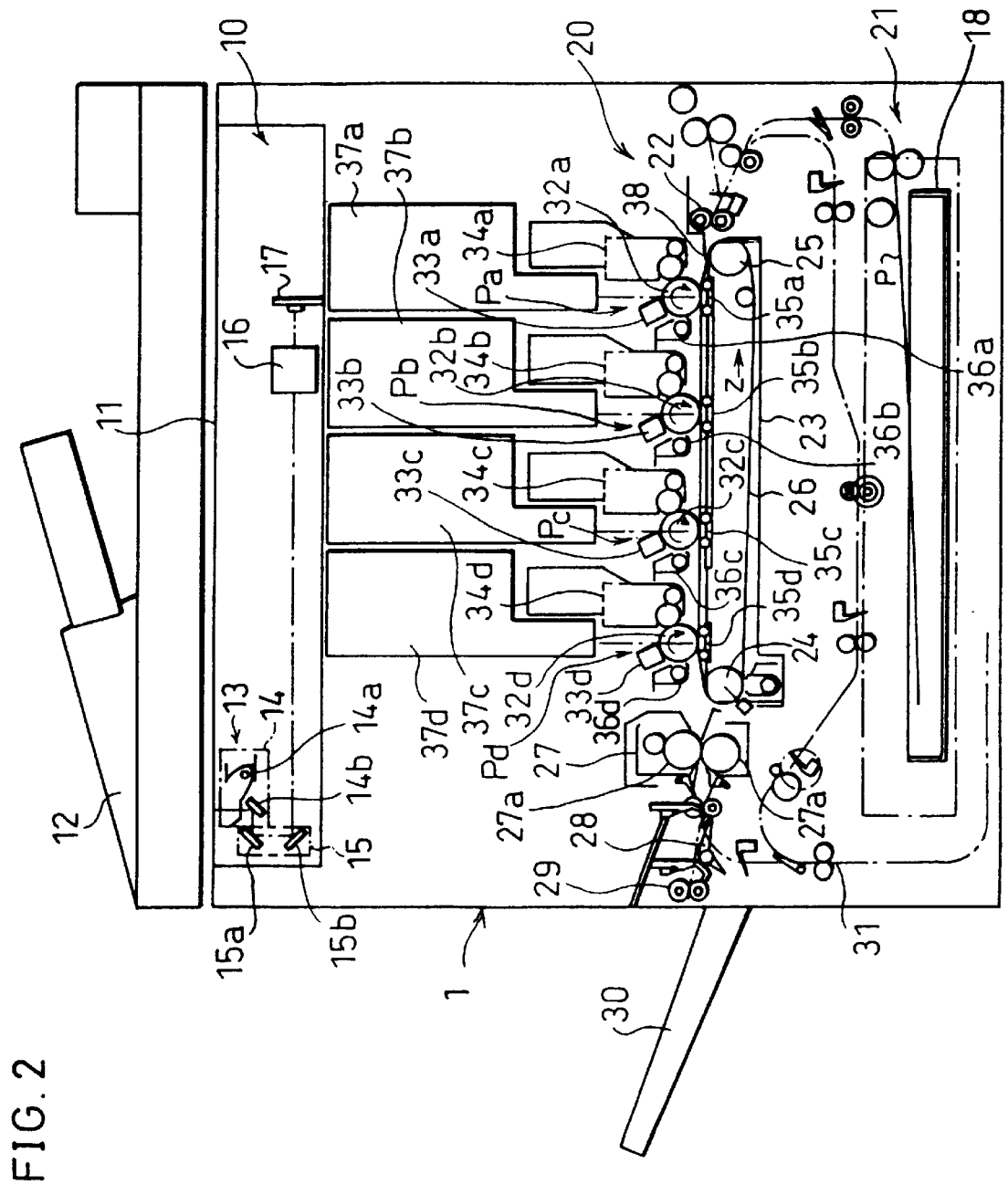
FIG. 2 is a cross-sectional view showing an arrangement of a color digital copying machine as an example of the image forming apparatus in accordance with the present invention.

As shown in FIG. 2, a color digital copying machine as an image forming apparatus of an embodiment in accordance with the present invention is provided with an original document platen 11 and a later-mentioned operation panel 60 (see FIG. 5) on an upper surface of a copying machine main body 1 and with an image detecting (reading) section 10 and an image forming section (image forming means) 20 inside the copying machine main body 1.

A recirculating automatic document feeder (RADF) 12, which is an automatic document feeder adapted to handle double-surface copying, is attached onto an upper surface of the original document platen 11 in such a manner to maintain the predetermined relative position of the recirculating automatic document feeder 12 to the upper surface of the original document platen 11. The recirculating automatic document feeder 12 is supported so that it can be opened and closed with respect to the original document platen 11.

In addition, the recirculating automatic document feeder 12 transports an original document so that one of the surfaces of the original document faces the image detecting section 10 in a predetermined position on the original document platen 11, and, after completing the image detection (image reading) of that surface, reverses and then transports the original document to the original document platen 11 so that the other surface faces the image detecting section 10 in a predetermined position on the original document platen 11. Subsequently, after completing the image detection of both surfaces of the original document, the recirculating automatic document feeder 12 ejects the original document and performs double-surface transport operation on another original document. The foregoing operation of transporting the original document and reversing the front and back surfaces thereof is controlled in relation to the operation of the copying machine on the whole.

The image detecting section 10, disposed under the original document platen 11 to read an image of the original document transported onto the original document platen 11 by the recirculating automatic document feeder 12, is constituted by an original document scanner 13 that moves back and forth parallel to the undersurface of the original document platen 11, an optical lens 16, and a CCD line sensor 17 that is a photoelectric conversion element.

The original document scanner 13 is constituted by a first scanner unit 14 and a second scanner unit 15. The first scanner unit 14, constituted by an exposure lamp 14a for exposing a surface of an original document image to light, and a first mirror 14b for polarizing the light reflected at the original document in a predetermined direction, moves back and forth parallel to the undersurface of the original document platen 11 at a predetermined scan velocity while maintaining a constant distance from the undersurface of the original document platen 11. The second scanner unit 15, constituted by a second and third mirrors 15a and 15b for further polarizing, in a predetermined direction, the light reflected at the original document and then polarised at the first mirror 14b in the first scanner unit 14, moves back and forth parallel to the first scanner unit 14 while maintaining a constant relative velocity to the first scanner unit 14.

The optical lens 16 concentrates an image formed by light reflected at the original document and then polarized at the third mirror 15b in the second scanner unit 15, and focuses the concentrated image in a predetermined place on the CCD line sensor 17.

The CCD line sensor 17 photoelectric-converts the focused image sequentially and outputs electric signals. The CCD line sensor 17 is a 3-lined color CCD capable of detecting a color image and outputting color-separated line data of Y (yellow), M (magenta), and C (cyan). The original document image information transferred into electric signals by the CCD line sensor 17 is further forwarded to a later-mentioned image processing section (see FIG. 3) and subjected to predetermined image data processing.

The following description will discuss an arrangement of the image forming section 20 and peripherals thereof.

Under the image forming section 20 is provided a paper feeder assembly 21 for feeding paper sheets (recording media) P stacked and stored in a paper tray 18 to the image forming section 20 after separating those paper sheets from one another. A paper sheet P, after being separated from the others, is transported to the image forming section 20 at a timing controlled by a pair of resist rollers 22 disposed before the image forming section 20. Further, the paper sheet P, carrying an image formed on one of the surfaces thereof, is again transported to, and fed into, the image forming section 20 at a proper timing for image formation by the image forming section 20.

Below the image forming section 20 is provided a transfer and transport belt assembly 23 arranged so as to electrostatically attract the paper sheet P onto a transfer and transport belt 26 suspended so as to extend substantially parallel between a drive roller 24 and an auxiliary roller 25.

In addition, a fixer device 27 for fixing a toner image transferred to, and formed on, the paper sheet P is disposed in the downstream side of the transfer and transport belt assembly 23 along the sheet transport path. The paper sheet P, having passed through a nip between a pair of fixer rollers 27a in the fixer device 27, passes through a transport direction switching gate 28 and is ejected by an ejection roller 29 onto an ejected sheet tray 30 disposed on an external sidewall of the copying machine main body 1.

The switching gate 28 selectively switches the transport path for the paper sheet P carrying an image fixed thereon between a path to eject the paper sheet P to the copying machine main body 1 and a path to refeed the paper sheet P to the image forming section 20. The paper sheet P having the transport direction thereof switched by the switching gate 28 so as to be refed to the image forming section 20 is reversed with respect to the surfaces thereof by a switchback transport path 31, and then refed to the image forming section 20.

A first image forming station Pa, a second image forming station Pb, a third image forming station Pc, and a fourth image forming station Pd are provided closely above the transfer and transport belt 26 in the image forming section 20 in this order along the sheet transport path from the upstream side thereof.

The transfer and transport belt 26 is driven by the friction with drive roller 24 in the direction denoted by the arrow Z in FIG. 2, carrying the paper sheet P fed via the paper feeder assembly 21 as previously mentioned and feeding the paper sheet P to the image forming stations Pa through Pd sequentially.

The image forming stations Pa through Pd share a substantially common arrangement. The image forming stations Pa through Pd include photosensitive drums 32a through 32d respectively that are driven to rotate in the direction denoted by the arrow in FIG. 1.

Chargers 33a through 33d for uniformly charging the respective photosensitive drums 32a through 32d, developer devices 34a through 34d for developing respective electrostatic latent images formed on the photosensitive drums 32a through 32d, transfer discharger 35a through 35d for transferring the toner images developed on the photosensitive drums 32a through 32d onto the paper sheet P, and cleaner devices 36a through 36d for removing residual toner off the surfaces of the photosensitive drums 32a through 32d are provided around the photosensitive drums 32a through 32d in this order along the rotation direction of the photosensitive drums 32a through 32d.

Above the photosensitive drums 32a through 32d are provided laser beam scanner units 37a through 37d each constituted by, for example (not shown), a semiconductor laser element for generating dot light modified according to image data, a polarizer device for polarizing the light from the semiconductor laser element in the primary scanning direction, and an fθ lens for focusing the laser beam polarized at the polarizer device on the surface of the photosensitive drum 32a through 32d.

The laser beam scanner unit 37a is supplied with image signals corresponding to the yellow image component of a color original image, the laser beam scanner unit 37b is supplied with image signals corresponding to the magenta image component of the color original image, the laser beam scanner unit 37c is supplied with image signals corresponding to the cyan image component of the color original image, and the laser beam scanner unit 37d is supplied with image signals corresponding to the black image component of the color original image. Hence, electrostatic latent images corresponding to the color-converted original document image information are formed on the respective photosensitive drums 32a through 32d. The developer device 34a through 34d store yellow, magenta, cyan, and black toners respectively, and the electrostatic latent images on the photosensitive drums 32a through 32d are developed by those toners. The original document image information color-converted by the image forming section 20 is thus reproduced as the toner images of the four colors.

Between the first image forming station Pa and the paper feeder assembly 21 is provided a sheet attracting charger 38, which is a brush charger, for charging the surface of the transfer and transport belt 26. The paper sheet P fed from the paper feeder assembly 21 is thereby firmly attracted onto the transfer and transport belt 26 during the transport from the first image forming station Pa through the fourth image forming station Pd without being displaced.

Meanwhile, almost right above the drive roller 24 between the fourth image forming station Pd and the fixer device 27 is provided a discharger (not shown) supplied with an a.c. current for separating the paper sheet P electrostatically attracted onto the transfer and transport belt 26 off the transfer and transport belt 26.

In the color digital copying machine having the above arrangement, a cut-out paper sheet is used as the paper sheet P. As the paper sheet P is exported from a paper feeder cassette and fed into a guide of a paper feeder transport path of the paper feeder assembly 21, the leading edge of the paper sheet P is detected by a sensor (not shown) and the paper sheet P is temporarily stopped by the pair of resist rollers 22 according to a detection signal output from the sensor.

The paper sheet P is then exported onto the transfer and transport belt 26 at a proper timing to the image forming stations Pa through Pd. Here, since the transfer and transport belt 26 is charged by the sheet attracting charger 38 in a predetermined manner as previously mentioned, the paper sheet P is transported and fed in a stable manner while being passed through the image forming stations Pa through Pd.

The toner images of the four colors are formed in the respective image forming stations Pa through Pd and superimposed on the paper sheet P electrostatically attracted to, and transported by, the transfer and transport belt 26. After the completion of the image transfer by the fourth image forming station Pd, the paper sheet P is removed, starting with the leading edge thereof, off the transfer and transport belt 26 by the discharger, and guided to the fixer device 27. Finally the paper sheet P, on which the toner images are fixed, is ejected onto the ejected sheet tray 30 via a sheet ejection port (not shown).

Figure 3:
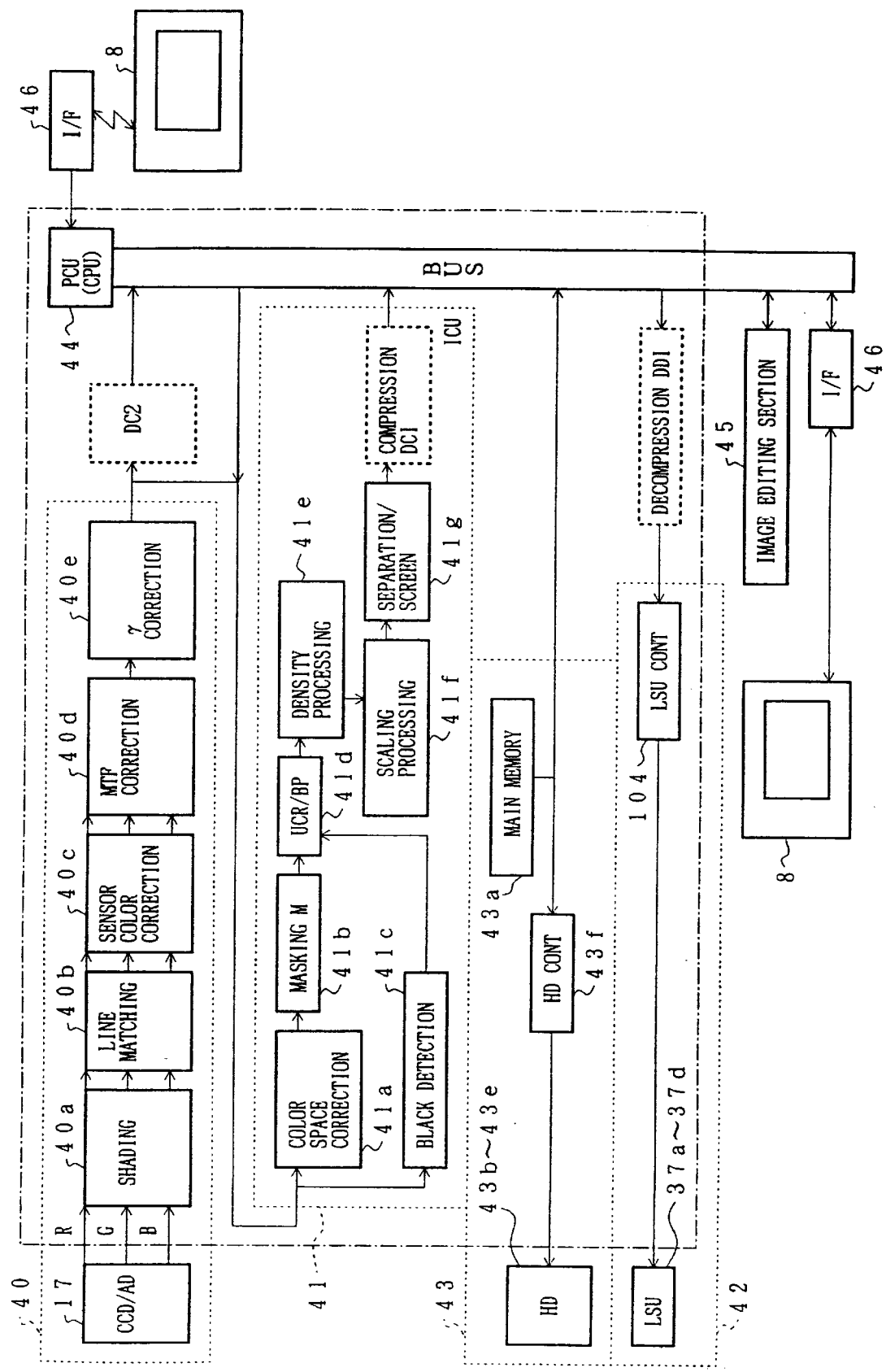
FIG. 3 is a block diagram showing a circuit arrangement of an image processing section of the color digital copying machine.

Next, referring to the block diagram of FIG. 3, the following description will discuss an arrangement and functions of an image processing section, incorporated in a color digital copying machine, for image-processing color image information.

As shown in FIG. 3, the image processing section includes an image data input section 40, an image data processing section (ICU or Image Control Unit) 41, an image data output section 42, an image storage section 43 constituted by a hard disk device, RAM (Random Access Memory), etc., a print control section (PCU or Print Control Unit) 44, an image editor section 45, and an external interface section (I/F) 46 that is an image data communication unit.

The image data input section 40 includes, for example, a shading correcting circuit 40a for correcting a line image level of an image line data read by the CCD line sensor 17, a line matching section 40b having, e.g., a line buffer for correcting displacement of the image line data read by the CCD line sensor 17, a sensor color correcting section 40c for correcting color data of line data of the four colors output from the CCD line sensor 17, an MTF (Modulation Transfer Function) correcting section 40d for correcting to produce distinct signal variations for the pixels, and a γ-correcting section 40e for correcting visibility by correcting brightness of the image.

The image data processing section 41 is supplied with color image signal input from the image data input section 40, and, as detailed later, with external color image signal input through the external interface section 46. The image data processing section 41 includes, for example, a color space correcting circuit 41a for correcting a color reproduction spectrum of a color image signal supplied by the image data input section 40 or externally to a color reproduction spectrum by the color toner in the image forming section 20, a masking circuit 41b for converting RGB signals of an input image data to YMC signals corresponding to the image forming stations Pa through Pd in the image forming section 20, a black detecting circuit 41c for detecting a black component in the RGB signals of the color image input supplied by the image data input section 40 or externally, an under color removal and black plus circuit 41d for performing a base color removing process of carrying out black detection according to the YMC signal output supplied by the masking circuit 41b and a black color adding process of adding black component signal output supplied by the black detecting circuit 41c, a density processing circuit 41e for adjusting a density of a color image signal according to a density conversion table, a scaling processing circuit 41f for processing scaling of image information input according to a specified multiple, a separation and screen circuit 41g for detecting and area-separating characters, photographs, and watermarked areas in image information from the input image data and for determining an output pattern of an image.

The image data output section 42 includes a laser control unit 104 for modulating a pulse width according to image data of each color, and laser scanner units 37a through 37d, for the respective colors, for performing laser recording according to pulse width modulation signals that are in accordance with image signals for each color supplied by the laser control unit 104.

The image storage section 43 includes a main memory 43a for sequentially receiving and temporarily storing 4-color, 8-bit (32 bits) image data serial-supplied by the image data processing section 41, hard disks 43b through 43e that are four rotary storage media for storing and managing the 4-color, 8-bit image data as image data for the respective colors, and a hard disk control unit 43f for controlling the hard disks 43b through 43e.

The hard disk control unit 43f sequentially receives the 32-bit image data temporarily stored on the main memory 43a, converts the 32-bit image data into 4-color, 8-bit image data, and parallel-outputs the converted image data to the four hard disks so that the data is stored on, and managed by, the four hard disks.

The print control section 44 is constituted by a CPU for controlling the entire color digital copying machine including the image data input section 40, image data processing section 41, image data output section 42, image storage section 43, image editor section 45, external interface section 46, etc. according to predetermined sequences.

The image editor section 45 performs a predetermined image editing via the image data input section 40 and image data processing section 41 or via a later mentioned interface on the image data stored on the image storage section 43.

In addition, the external interface section 46 is a communication interface provided so as to enable information communication of, for example, image data and image control signals with other digital information apparatuses, and is connected to the main memory 43a of the image storage section 43. The external interface section 46 is arranged to be capable of receiving image data from an external image input processing device 8 provided separately from the color digital copying machine.

The image data input by the external interface section 46 is also temporarily input to the image data processing section 41, converted to a data level that can be manipulated by the image forming section 20 by performing a correction such as color space correction, and then stored on and managed by the hard disks 43b through 43e.

Figure 4:
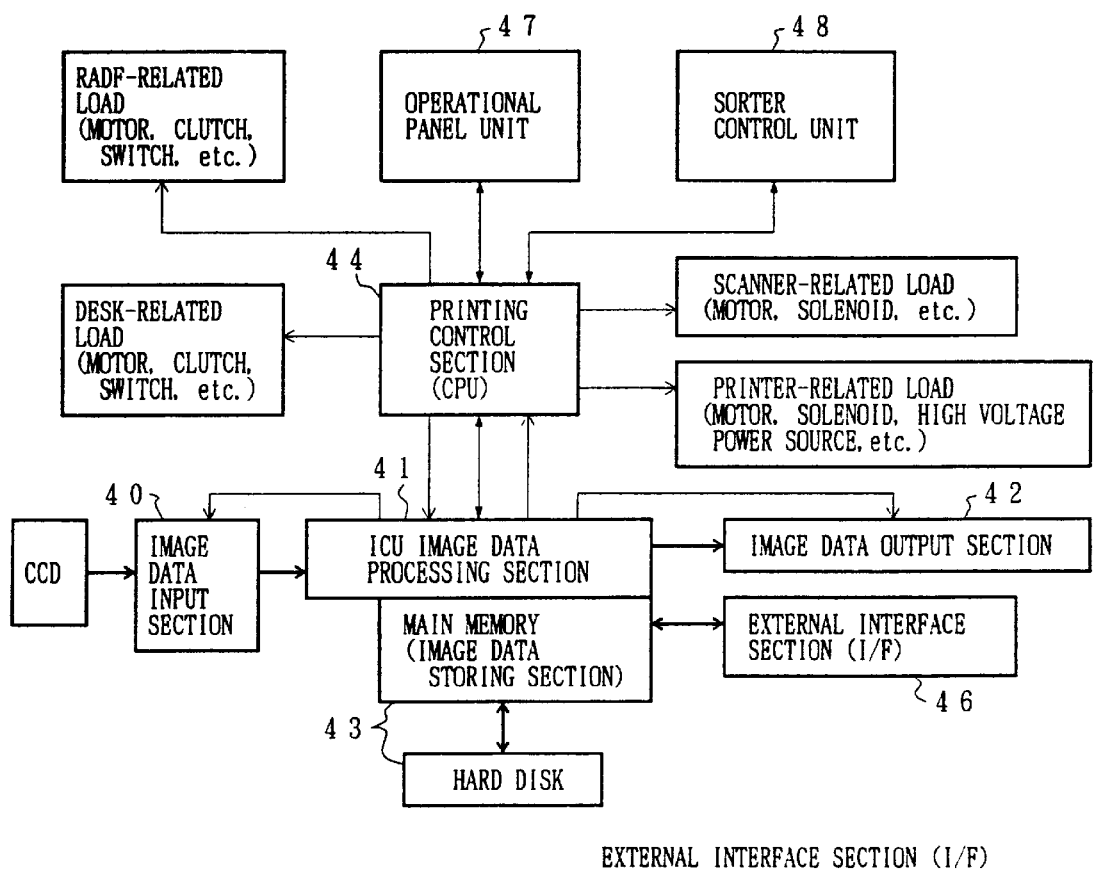
FIG. 4 is a block diagram showing a control system of the color digital copying machine.

Now, referring to FIG. 4, the following description will discuss a control system, including the print control section 44, for controlling operations of various components of the color digital copying machine.

As shown in FIG. 4, the print control section 44 is connected to desk-related loads, RADF-related loads, an operation panel unit 47, a sorter control unit 48, scanner-related loads, printer-related loads, and the image data processing section 41.

The desk-related loads are loads of motors, clutches, and the like of a multistage paper feeder unit (not shown) for feeding paper sheets into a color digital copying machine from a plurality of stages, and of a sorter (not shown) incorporated in a post-processing device for sorting copied sheets ejected from the color digital copying machine. The RADF-related loads are loads of motors, clutches, switches, and the like provided to the recirculating automatic document feeder 12. The scanner-related loads are loads of motors, solenoids, and the like provided to the image detecting section 10. The sorter control unit 48, including a CPU, is for controlling the operation of the sorter according to control signals from the print control section 44. The printer-related loads are loads of motors, solenoids, high voltage power supplies, and the like provided to the image forming section 20.

The print control section 44 supplies control signals to various components of the color digital copying machine, such as the recirculating automatic document feeder 12, image detecting section 10, and image forming section 20, to sequence-controlling those components.

The print control section 44 is connected to the operation panel unit 47, through which an operator enters various settings and commands, for example, copy mode settings, to the color digital copying machine main body, such that the print control section 44 and operation panel unit 47 can communicate with each other. The operation panel unit 47 includes a later detailed operation panel 60 (see FIG. 5) and a CPU for transferring control signals to the print control section 44 according to a mode setting entered by an operator, for example, a copy mode.

The print control section 44 is for controlling the color digital copying machine under the aforementioned mode according to the control signals transferred from the operation panel unit 47. The print control section 44 is further arranged to transfer control signals indicating current operation conditions of the color digital copying machine to the operation panel unit 47. According to those control signals, the operation panel unit 47 displays the operation conditions of the color digital copying machine on a display section for the operator.

Figure 5:
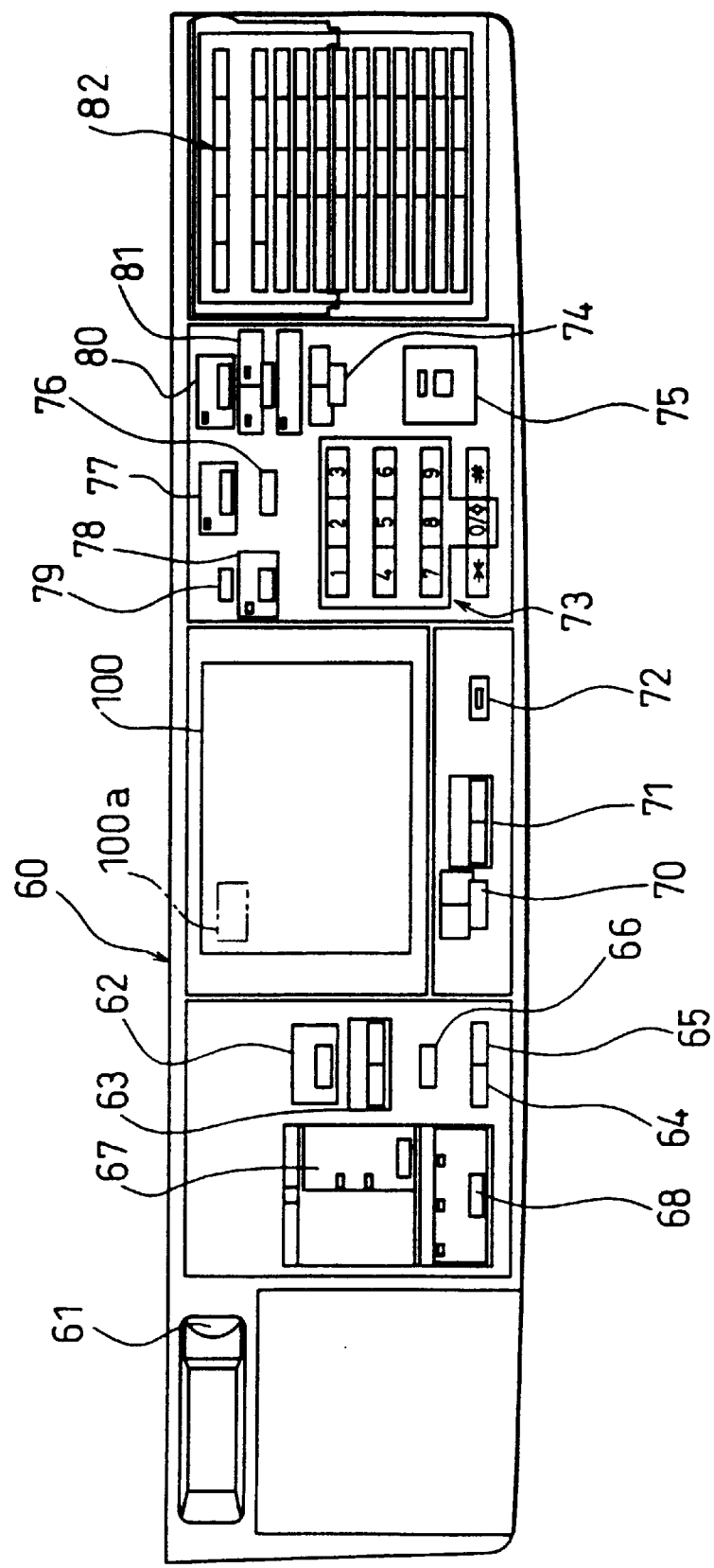
FIG. 5 is a plan view showing an operation panel of the color digital copying machine.

The operation panel unit 47 includes the operation panel 60 as an input section shown in FIG. 5.

In the central part of the operation panel 60 is provided a touch panel 100 that is a pointing device including a liquid crystal display device. Various keys 61 to 68 and 70 to 82 are provided around the touch panel 100. On a part of the touch panel 100 is provided a screen switching command area 100a through which a command is entered to switch the display on the touch panel 100 to a display for selecting image editor functions. As an operator directly presses the screen switching command area 100a with his/her finger, various image editor functions appear in a list on the screen of the liquid crystal display device of the touch panel 100 to allow the operator to select the image editor functions. A desired image editor function is set by the operator touching the display area showing that desired image editor function in the display area on the touch panel 100 showing the list of image editor functions.

The following description will briefly discuss the keys 61 to 68 and 70 to 82 disposed on the operation panel 60.

The operation panel 60 is provided at the far left side thereof with a brightness adjustment dial 61 for adjusting the brightness of the screen of the liquid crystal display device of the touch panel 100. Between the brightness adjustment dial 61 and the touch panel 100 are provided an automatic multiple specification key 62 for setting an automatic multiple mode under which the copying multiple is automatically selected, a zoom key 63 for increasing or decreasing the copying multiple by 1%, fixed multiple keys 64 and 65 for retrieving and selecting a fixed multiple, a non-scaling key 66 for setting the copying multiple to 1, which is the default setting, a double-surface mode setting key 67 for setting a double-surface copy mode, and a post-process mode setting key 68 for setting operation modes of the post processing device.

Below the touch panel 100 on the operation panel 60 are provided a density switching key 70 for switching the copy density adjustment from an automatic mode to a manual mode or photographic mode, a density adjustment key 71 for setting the density level in small increments under the manual or photographic mode, and a tray selection key 72 for selecting the tray accommodating sheets of a desired size from a plurality of sheet trays 18 installed in the paper feeder assembly 21 in the color digital copying machine.

Meanwhile, to the right of the touch panel 100 on the operation panel 60 are provided a number-of-sets specification key 73 for specifying the number of sets of copied documents, a clear key 74 for entering a command to clear the number of sets of copied documents or cancel a continuous copying, a start key 75 for entering a command to start copying, a full reset key 76 for clearing all of the currently specified mode and restoring the default state, an intervention key 77 for entering a command to copy a different document during continuous copying, an operation guide key 78 for displaying operation methods of the color digital copying machine as messages through manipulation by the operator when he/she does not understand the operations of the color digital copying machine, and a message forwarding key 79 for moving the message displayed as a result of the manipulation of the operation guide key 78 to a next one.

In addition, to the right of the touch panel 100 on the operation panel 60 are provided keys relating to printer mode and facsimile mode: namely, a memory transmission mode specification key 80, a copy mode/facsimile mode/printer mode switching key 81, and a single touch dial key 82.

The memory transmission mode specification key 80 is for setting the facsimile transmission mode to a memory transmission mode of temporarily storing a document to be transmitted on memory before transmission. The copy mode/facsimile mode/printer mode switching key 81 is for switching the mode of the color digital copying machine among a copy mode, a facsimile mode, and a printer mode. The single touch dial key 82 is for allowing, when making a facsimile transmission, a single touch thereon to dial the telephone number of the recipient stored in advance and establish a telephone communication.

Incidentally, the arrangement of the operation panel shown in FIG. 5 is a mere example. The keys provided on the operation panel vary depending upon functions imparted to the color digital copying machine.

Figure 1:
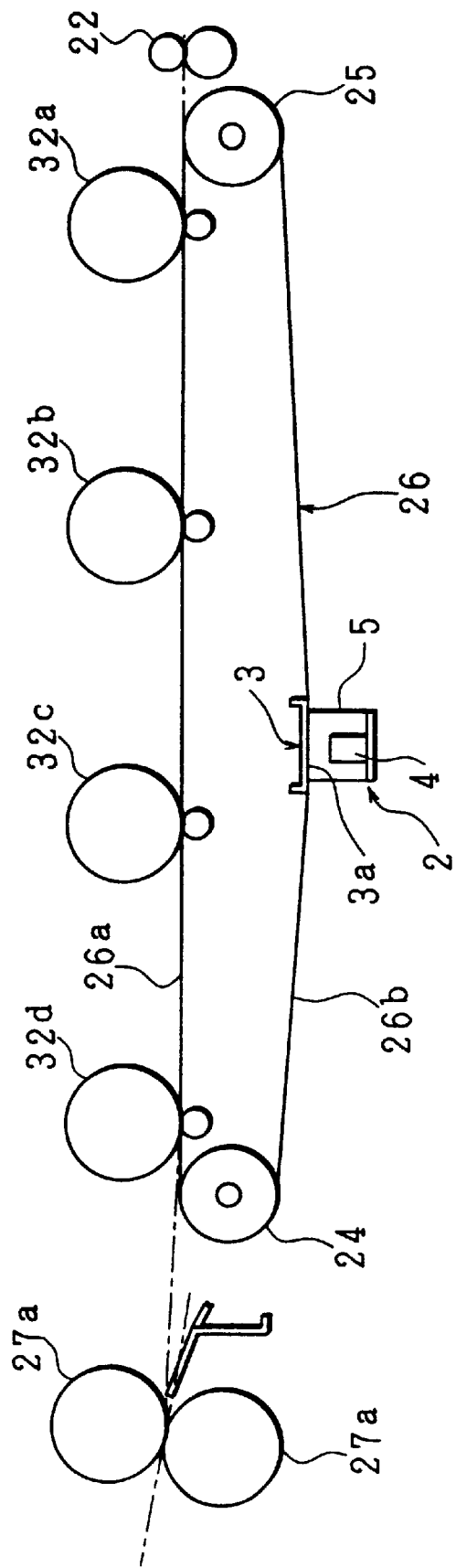
FIG. 1 is a cross-sectional view showing an example of the arrangement of a pattern image detecting unit and peripherals thereof incorporated in a color digital copying machine as an example of the image forming apparatus in accordance with the present invention.

Now, referring to the cross-sectional view shown in FIG. 1, the following description will discuss feature arrangements of the present invention.

The transfer and transport belt 26 is an endless belt suspended between the drive roller 24, as a supporting member, driven to rotate by a drive device (not shown) and the auxiliary roller 25, as a supporting member, rotating with the transfer and transport belt 26. The transfer and transport belt 26 moves while carrying a pattern image formed by the image forming section 20 on a surface thereof. The transfer and transport belt 26 is arranged to be capable of, when forming an image on the paper sheet P, moving, while carrying the paper sheet P to be transported on the surface thereof (see FIG. 2), and transporting the paper sheet P to the fixer rollers 27a.

The transfer and transport belt 26 has two suspended segments 26a and 26b between the drive roller 24 and the auxiliary roller 25. The photosensitive drums 32a through 32d of the image forming section 20 are disposed close to the suspended segment 26a, and a pattern image detecting unit 2 is disposed to the suspended segment 26b that is farther from the image forming section 20 than the suspended segment 26a. Note that the suspended segments 26a and 26b refer to those segments of the transfer and transport belt 26 that are not in touch with either the drive roller 24 or the auxiliary roller 25.

The pattern image detecting unit 2 includes a pattern image detecting sensor (pattern image detecting means) 4 for detecting a pattern image formed on the outer surface of the suspended segment 26a of the transfer and transport belt 26, a back surface contact member 3 for coming in contact with the back surface of a detection area for the pattern image detecting sensor 4 on the suspended segment 26b of the transfer and transport belt 26, and a supporting frame (reading stabilizing means) 5 for supporting the back surface contact member 3 and pattern image detecting sensor 4 while maintaining the relative positions (distance and angle) of the back surface contact member 3 and pattern image detecting sensor 4 under certain conditions.

The pattern image detecting sensor 4 is disposed close to the outer surface, of the suspended segment 26b of the transfer and transport belt 26, which is a pattern image forming surface. The back surface contact member 3 is disposed to be in contact with the back surface of the detection area of the suspended segment 26b of the transfer and transport belt 26, where the pattern image detecting sensor 4 detects the pattern image.

As a result, in the region where the back surface contact member 3 is in contact with the transfer and transport belt 26, the back surface contact member 3 forms a substantially flat, stable area in which the transfer and transport belt 26 is substantially flat in a stable manner. Here, that the transfer and transport belt 26 is substantially flat in a stable manner means that vibration of the transfer and transport belt 26 caused by the movement of the transfer and transport belt 26 in a predetermined direction is restrained.

Attention is paid to the contact area of the back surface contact member 3 and transfer and transport belt 26 so that a substantially flat, stable area is formed at least covering the detection area for the pattern image detecting sensor 4. In other words, the pattern image detecting sensor 4 is disposed so as to maintain a predetermined relative position thereof to the substantially flat, stable area of the transfer and transport belt 26 and eventually to detect the pattern image formed on the transfer and transport belt 26 in the substantially flat, stable area of the transfer and transport belt 26.

This prevents the pattern image detecting sensor 4 from changing the relative position thereof to the detection area on the transfer and transport belt 26, and causes the detection of the pattern image formed on the transfer and transport belt 26 to be conducted in a more reliable and stable manner. As a result, the control can be conducted in a more reliable and stable manner according to the detection signal output from the pattern image detecting sensor 4.

The back surface contact member 3 have a flat, smooth surface 3a that establishes a surface-to-surface contact with the back surface of the detection area for the pattern image detecting sensor 4 on the suspended segment 26b of the transfer and transport belt 26. This ensures the formation of a substantially flat, stable area where the flat smooth surface 3a is in contact with the transfer and transport belt 26.

The back surface contact member 3 and pattern image detecting sensor 4 are supported by the supporting frame 5 to maintain the distance from the pattern image detecting sensor 4 to the pattern image forming surface, that is the sensor detection surface, of the transfer and transport belt 26.

By maintaining the distance from the pattern image detecting sensor 4 to the surface where the back surface contact member 3 is into contact with the transfer and transport belt 26, stable and precise detection signals can be always obtained. Besides, since the back surface contact member 3 and the pattern image detecting sensor 4 are arranged so as to be supported by the common supporting frame 5, stable and precise detection signals can be always obtained by a simple arrangement with no special system. Besides, the back surface contact member 3 and pattern image detecting sensor 4, requiring a highly precise installation in terms of position, can be built in easily.

Further, since the back surface contact member 3 and pattern image detecting sensor 4 are supported by the supporting frame 5, by exerting a downward press force onto the supporting frame 5, a suitable tension of a constant amount can be applied to the transfer and transport belt 26. As a result, the pattern image formed on the transfer and transport belt 26 can be detected in a more reliable and stable manner.

The back surface contact member 3 is disposed to press a part of the suspended segment 26b down toward the pattern image detecting sensor 4 by the flat smooth surface 3a, and thus to apply a suitable, predetermined amount of tension to the suspended segment 26b. This enables the detection area of the transfer and transport belt 26 to be pressed on the back surface thereof toward the detection surface side of the pattern image detecting sensor 4 and to be located opposite to the detection surface side of the pattern image detecting sensor 4 in a stable manner.

Figure 6:
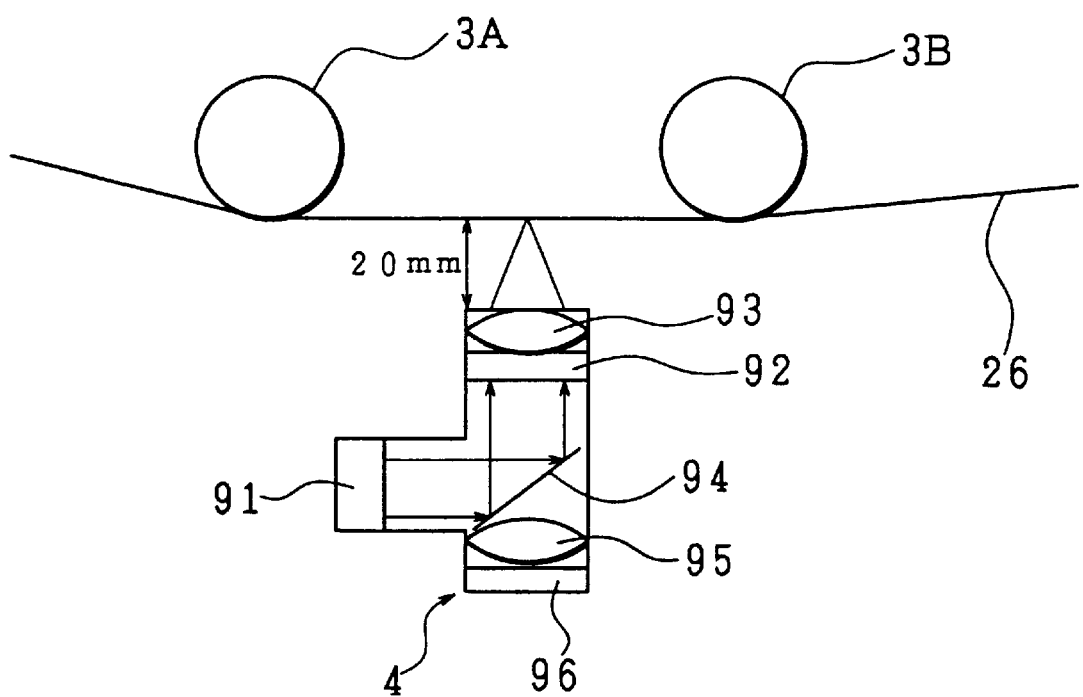
FIG. 6 is a cross-sectional view showing an example of the arrangement of a pattern image detecting sensor incorporated in the pattern image detecting unit.

The pattern image detecting sensor 4 is, for example, a sensor composed of a laser beam source (LD) 91, a collimator lens 92, a lens 93, a beam splitter 94, another lens 95, and a light receptor element 96 as shown in FIG. 6.

The laser beam source 91 is for generating a laser beam for detecting the pattern image. The collimator lens 92 is for modifying the beam shape of the laser beam radiating from the laser beam source 91 into a complete circle. The lens 93 is for focusing the laser beam radiating from the laser beam source 91 to form a tiny spot on the transfer and transport belt 26.

The beam splitter 94 is for reflecting and guiding the laser beam radiating from the laser beam source 91 to the collimator lens 92 and allowing the light reflected at the transfer and transport belt 26 and travelling via the lens 93 and collimator lens 92 to pass toward the lens 95.

The lens 95 is for focusing the beam reflected at the transfer and transport belt 26 and having passed through the beam splitter 94 on the light receptor element 96. The light receptor element 96 is an photoelectric conversion element, e.g. photodiode, for receiving the reflected and focused beam and then outputting electric signals to the print control section (image forming condition control means) 44 according to the amount of light received.

The pattern image detected by the pattern image detecting sensor 4 is for adjusting the timings for the image forming stations Pa through Pd of the four colors, shown in FIG. 2, to form images of the respective colors so that those images are superimposed precisely to reproduce a single color image.

In other words, the image forming section 20 is arranged to form as a pattern image a registration mark representing where to start the formation of the image. The pattern image detecting sensor 4 is arranged to detect (measure) the location of the registration mark on the surface of the transfer and transport belt 26, and to output results of the detection (measurement) to the print control section 44 as signals. Then the print control section 44 controls the image formation starting timing, as image forming conditions, for the image forming stations Pa through Pd according to those results.

This controls the image formation timing for the image forming stations Pa through Pd according to the results of detecting the location of the registration mark formed on the transfer and transport belt 26, therefore enables the images of the four colors reproduced by the image forming stations Pa through Pd to be superimposed in a stable manner, and allows faithful image reproduction.

Incidentally, to control reproduction conditions of the image formed on the paper sheet P, the pattern image detected by the pattern image detecting sensor 4 may be a patch image for process control use for controlling image forming conditions for the image forming stations Pa through Pd for the four colors of the image forming section 20.

For example, the image forming section 20 forms a patch image on the transfer and transport belt 26 under certain conditions, the pattern image detecting sensor 4 detects an image density or dot diameter of the formed patch image, and the print control section 44 controls the image forming conditions for the image forming section 20 according to the detection results. The image forming conditions for the image forming section 20 refer to various conditions affecting the image density, dot diameter, etc., such as a pulse width modulated in the laser control unit 104 and a development bias voltage applied across the developer devices 34a through 34d.

The charging and other properties of the surfaces of the photosensitive drums 32a through 32d and developer devices 34a through 34d vary due to aging over a long period of time and natural environment such as temperatures and humidity. However, by controlling the image forming conditions (image forming process) for the image forming section 20 according to the detection results of the patch image in the above manner, variations in the image density and dot diameter caused by the foregoing variations can be corrected to stabilize the image. As a result, the image forming section 20 can reproduce image information on the paper sheet P faithfully.

Now, the following description will discuss further efforts to improve the precision in detecting the pattern image by the pattern image detecting sensor 4.

The back surface contact member 3, which is in contact with the back surface of the transfer and transport belt 26, forms a substantially flat, stable area having a predetermined width in the moving direction of the transfer and transport belt 26 and in a direction perpendicular to the moving direction of the transfer and transport belt 26 (i.e., width direction). This surely improves the precision in the detecting by the pattern image detecting sensor 4.

The back surface contact member 3 is in contact with the back surface of the detection area of the transfer and transport belt 26 for the whole width of the transfer and transport belt 26. This causes the tension and load applied by the back surface contact member 3 to the transfer and transport belt 26 to be uniform for the whole width of the transfer and transport belt 26. As a result, the transfer and transport belt 26 can move in a stable manner in a predetermined direction without wobbling. Therefore, since the paper sheet P can be transported without being bent at the surface thereof, blurred or distorted images can be prevented.

Further, the surface of the back surface contact member 3 that is in contact with the transfer and transport belt 26 may be made of a hard, low-friction material. This reduces the friction between the transfer and transport belt 26 and the back surface contact member 3, therefore can prevent a negative effect of the back surface contact member 3 on the movement of the transfer and transport belt 26, for example, interruption of a stable movement of the transfer and transport belt 26 caused by the application of an unnecessarily large load to the transfer and transport belt 26, and allows the transfer and transport belt 26 to move in a more stable manner.

Next, various kinds of sheets were tested in an experiment detailed below by placing toner thereon and detecting the toner using the pattern image detecting sensor 4.

First, four kinds of sheets, including a PVDF (polyvinylidene fluoride) sheet, PI (modified polyimide) sheet, PC (polycarbonate) sheet, and E/TFE (ethylene/tetrafluoro ethylene copolymer) sheet, were irradiated with a laser beam, and the output from the light receptor element 96 resulting from the reflected laser beam was measured using the pattern image detecting sensor 4 having the aforementioned arrangement shown in FIG. 6.

Figure 7:
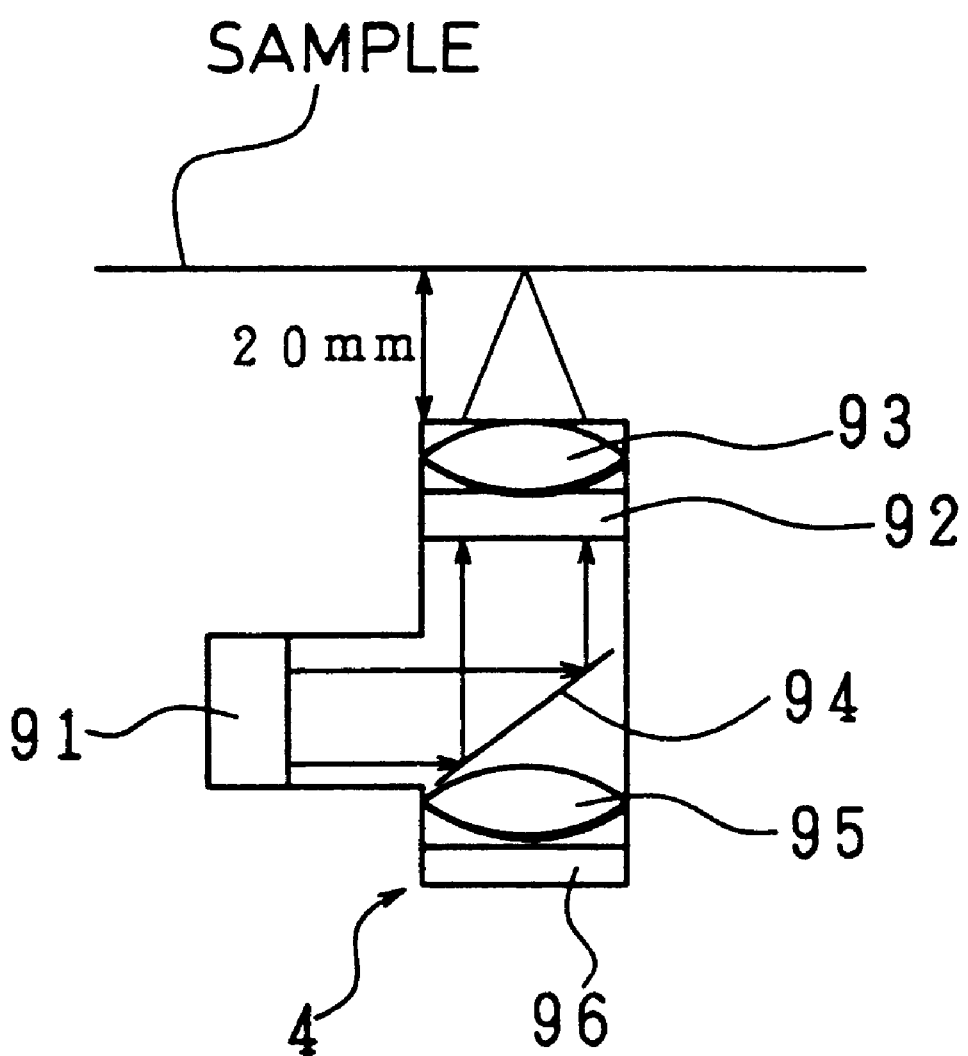
FIG. 7 is a cross-sectional view showing an experiment device to confirm whether or not the pattern image detecting sensor can detect toner.

Next, samples were prepared by placing, without fixing, black, magenta, yellow, and blue toners on each of the four kinds of sheets, and measured, using the pattern image detecting sensor 4 having the aforementioned arrangement shown in FIG. 6, for the output from the light receptor element 96 resulting from the laser beam directed and reflected at the toner applied surfaces of the samples as shown in FIG. 7. Table 1 shows the measurements.

TABLE 1

Output currents ($\mu$A) from the light receptor element (photodiode) 96

| Toner Substrate | No toner | Black | Magenta | Yellow | Blue |
| --- | --- | --- | --- | --- | --- |
| PVDF | 1.2 | 0.03 | 0.15 | 0.15 | 0.15 |
| PI | 1.5 | 0.01 | 0.15 | 0.15 | 0.15 |
| PC | 0.82 | 0.02 | 0.15 | 0.15 | 0.15 |
| E/TFE | 0.1 | 0.02 | 0.11 | 0.12 | 0.12 |

In this measurement, an optical sensor made by modifying a CD (compact disk) pickup including a photodiode as the light receptor element 96 to produce a laser beam having a wavelength $\lambda$ of 780 nm was used as the pattern image detecting sensor 4. The distance between the pattern image detecting sensor 4 and the samples were specified to about 20 mm.

From those results shown in Table 1, toner could be detected when the sheet was PVDF, PI, PC, or E/TFE, and especially easily when the sheet was PVDF or PI. Therefore, preferred materials for the transfer and transport belt 26 are PVDF, PI, PC, and E/TFE, and PVDF and PI are particularly favoured among them.

[Embodiment 2]

Figure 8:
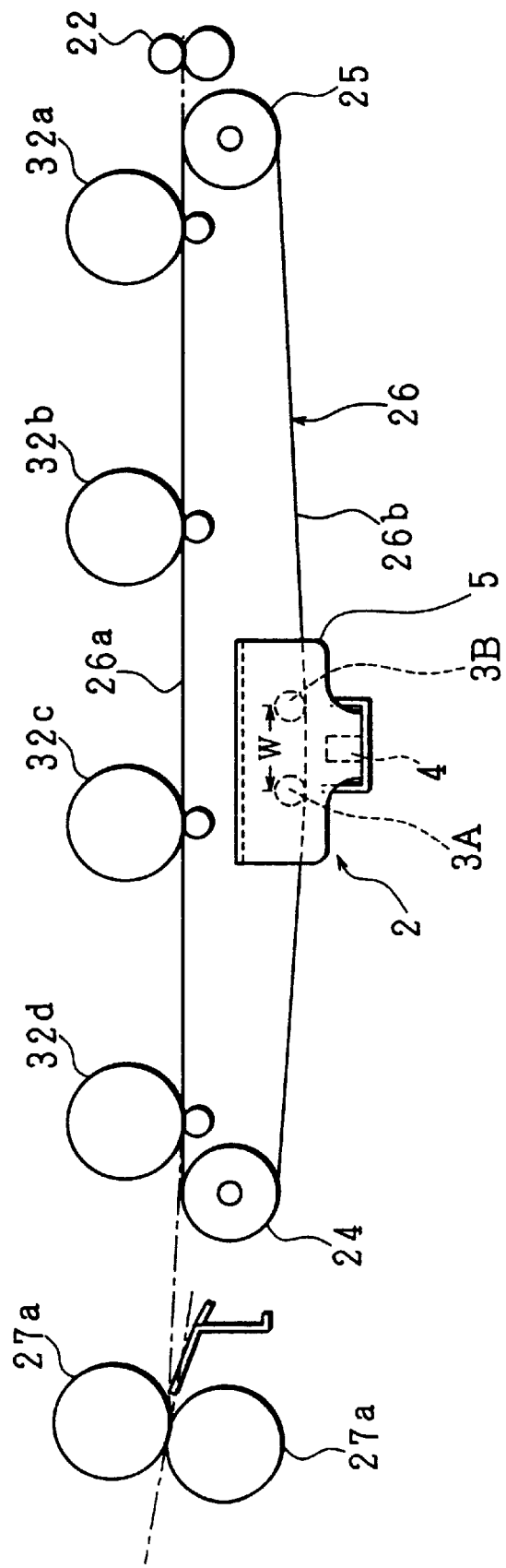
FIG. 8 is a cross-sectional view showing another example of the arrangement of a pattern image detecting unit and peripherals thereof incorporated in the color digital copying machine.

Referring to FIG. 8, the following description will discuss another embodiment in accordance with the present invention. Here, for convenience, members of the present embodiment that have the same arrangement and function as members of the previous embodiment, and that are mentioned in the previous embodiment are indicated by the same reference numerals and description thereof is omitted.

In a color digital copying machine of the present embodiment, in place of the back surface contact member 3, two contact rollers (back surface contact members) 3A and 3B are provided in contact with the suspended segment 26b of the transfer and transport belt 26 on the back surface of the detection area for the pattern image detecting sensor 4 as shown in FIG. 8. This enables a substantially flat, stable area to be formed on the transfer and transport belt 26 opposite to the empty space between the places where the contact rollers 3A and 3B are in contact with the transfer and transport belt 26. In the substantially flat, stable area, the vibration of the transfer and transport belt 26 is restrained and the transfer and transport belt 26 thus becomes stable and flat.

Besides, since the back surface contact members are those cylindrical contact rollers 3A and 3B, the contact surface of the transfer and transport belt 26 can be prevented from being scratched. As a result, the transfer and transport belt 26 can be prevented from wearing, and the stable movement of the transfer and transport belt 26 can be maintained.

The contact rollers 3A and 3B are arranged to form a substantially flat, stable area having a predetermined width in the moving direction of the transfer and transport belt 26 and in a direction perpendicular to the moving direction of the transfer and transport belt 26. Besides, the contact rollers 3A and 3B are in contact with the back surface of the detection area of the transfer and transport belt 26 for the whole width of the transfer and transport belt 26. This causes the tension and load applied to the transfer and transport belt 26 to be uniform for the whole width of the transfer and transport belt 26. As a result, the transfer and transport belt 26 can move in a predetermined direction in a stable manner, and blurred or distorted images can be prevented.

The contact rollers 3A and 3B preferably establish a line-to-line contact with the back surface of the detection area of the transfer and transport belt 26. This can reduce the contact area between the transfer and transport belt 26 and the contact rollers 3A and 3B to the smallest amount, therefore can prevent a negative effect of the contact rollers 3A and 3B on the movement of the transfer and transport belt 26, and allows the transfer and transport belt 26 to move in a more stable manner.

The contact rollers 3A and 3B are preferably arranged to rotate with the transfer and transport belt 26 while being in contact with the transfer and transport belt 26. This can prevent a negative effect of the contact rollers 3A and 3B on the movement of the transfer and transport belt 26, and allows the transfer and transport belt 26 to move in a more stable manner.

The contact rollers 3A and 3B are in contact with the surface of the transfer and transport belt 26 such that the contract rollers 3A and 3B lie parallel to the surface of the transfer and transport belt 26 and perpendicular to the moving direction of the transfer and transport belt 26 (i.e., width direction). This allows a uniform, stable tension to be applied to the transfer and transport belt 26, and ensures stable movement of the transfer and transport belt 26.

The pattern image detecting sensor 4 is disposed in a predetermined relative position opposite to the a substantially flat, stable area of the transfer and transport belt 26, and detects the pattern image formed on the transfer and transport belt 26 on the back surface of the middle section of the empty space between the places where the contact rollers 3A and 3B are in contact with the transfer and transport belt 26. This reduces the friction between the transfer and transport belt 26 and the contact rollers 3A and 3B, stabilizes the movement of the transfer and transport belt 26, and enables the pattern image detecting sensor 4 to perform detection in the most stable portion in the substantially flat, stable area ensured by the contact rollers 3A and 3B. As a result, the pattern image can be detected with high precision.

The amounts of the vibration (largest amplitude) of the substantially flat portion of the transfer and transport belt 26 between the contact rollers 3A and 3B are also affected by a distance W (see FIG. 8) from the place where the transfer and transport belt 26 is in contact with the contact roller 3A to the place where the transfer and transport belt 26 is in contact with the contact roller 3B.

By experiment, the pattern image could be detected extremely well by the pattern image detecting sensor 4 when the distance W was specified to 50 mm in a state where a tension of about 200 g was applied to the transfer and transport belt 26.

Therefore, the contact rollers 3A and 3B are preferably arranged so that the distance W is 100 mm or shorter. This further restrains the vibration and loosening of the substantially flat, stable area of the transfer and transport belt 26, holding the pattern image detection area of the transfer and transport belt 26 to be substantially flat in an even more stable manner. As a result, the detection precision of the pattern image detecting sensor 4 can be further improved, and the transfer and transport belt 26 can move in a stable manner in the image forming area.

Moreover, the pattern image detecting unit 2 applies a tension to the transfer and transport belt 26 by shifting the inner surface of a suspended segment of the transfer and transport belt 26 outward from the contact surface with the back surface contact members.

Here, the amounts of the vibration of the transfer and transport belt 26 vary depending upon the level of the tension caused by the relative shift of the pattern image detecting unit 2 to the transfer and transport belt 26.

As a result, it is highly likely that the pattern image detecting sensor 4 cannot detect the pattern image and output detection signals for the pattern image precisely and that highly precise control is disabled. Especially, if the pattern image detecting sensor 4 is a laser pickup sensor arranged as shown in FIG. 6, and the laser beam radiating from the laser beam source 91 has a beam diameter of 10 $\mu$m, since the pattern image detecting sensor 4 is supposed to detect the normally reflected laser light, the angle allows for little deviation. Since the lens depth is short, the detection distance again allows for little deviation.

Therefore, tension is preferably applied to the transfer and transport belt 26 so that the transfer and transport belt 26 does not vibrate in the substantially flat detection area of the transfer and transport belt 26 on which the pattern image is formed and that stable movement of the transfer and transport belt 26 is ensured.

An experiment (see Embodiment 3) shows that the increment in the tension applied to the transfer and transport belt 26 by the shift of the pattern image detecting unit 2 is most preferably 180 g or greater. The upper limit of the tension applied to the transfer and transport belt 26 by the shift of the pattern image detecting unit 2 should be specified considering the strength of the transfer and transport belt 26, the stability in the movement of the transfer and transport belt 26 driven by the drive roller 24 and auxiliary roller 25, the load on the drive source for the drive roller 24, and the like.

As detailed above, by the aforementioned specifications of the tension level of the transfer and transport belt 26 and of the interval between the places where the contact rollers 3A and 3B are in contact with the transfer and transport belt 26 in the foregoing ranges, the transfer and transport belt 26 can move in a stable manner in the image forming area, and the vibration of the transfer and transport belt 26 can be restrained in the pattern image detection area.

Besides, since the eccentricity of the contact rollers 3A and 3B changes the transport velocity of the transfer and transport belt 26 at the variation cycle equal to the rotation cycle of the contact rollers 3A and 3B, the eccentricity of the contact rollers 3A and 3B is preferably restrained as much as possible.

Moreover, in order to obtain stable sensor output under conditions such as the aforementioned tension level of the transfer and transport belt 26 and eccentricity of the contact rollers 3A and 3B, the angle of the pattern image detecting sensor 4 also needs be specified in a predetermined range to the surface of the transfer and transport belt 26.

Note that the contact surfaces of the contact rollers 3A and 3B with the transfer and transport belt 26 should be made of a hard, low-friction material. This reduces the friction between the transfer and transport belt 26 and the contact rollers 3A and 3B, therefore can prevent a negative effect of the contact rollers 3A and 3B on the movement of the transfer and transport belt 26, for example, interruption of a stable movement of the transfer and transport belt 26 caused by the application of an unnecessarily large load to the transfer and transport belt 26, and allows the transfer and transport belt 26 to move in a more stable manner.

Also, instead of the contact rollers 3A and 3B, two back surface contact members having a different shape therefrom can be used. However, the back surface contact members preferably have a smooth shape with no corners, e.g. an arc-like shape, in the contact portions (areas, lines) where the back surface contact members are in contact with the transfer and transport belt 26. This can restrain a negative effect of the back surface contact members on the movement of the transfer and transport belt 26, and allows the transfer and transport belt 26 to move in a more stable manner. Besides, since the back surface contact members can be prevented from scratching the contact surface of the transfer and transport belt 26, the transfer and transport belt 26 can be prevented from wearing, and the stable movement of the transfer and transport belt 26 can be maintained.

Also, a single back surface contact member that is in contact with the back surface of the detection area of the transfer and transport belt 26 in two places can be used instead of the contact rollers 3A and 3B. In such a case, the back surface contact member again preferably has a smooth shape with no corners in the contact portion where the back surface contact member is in contact with the transfer and transport belt 26.

[Embodiment 3]

Referring to FIG. 9 through FIG. 20, the following description will discuss another embodiment in accordance with the present invention. Here, for convenience, members of the present embodiment that have the same arrangement and function as members of Embodiment 1, and that are mentioned in Embodiment 1 are indicated by the same reference numerals and description thereof is omitted.

Figure 9:
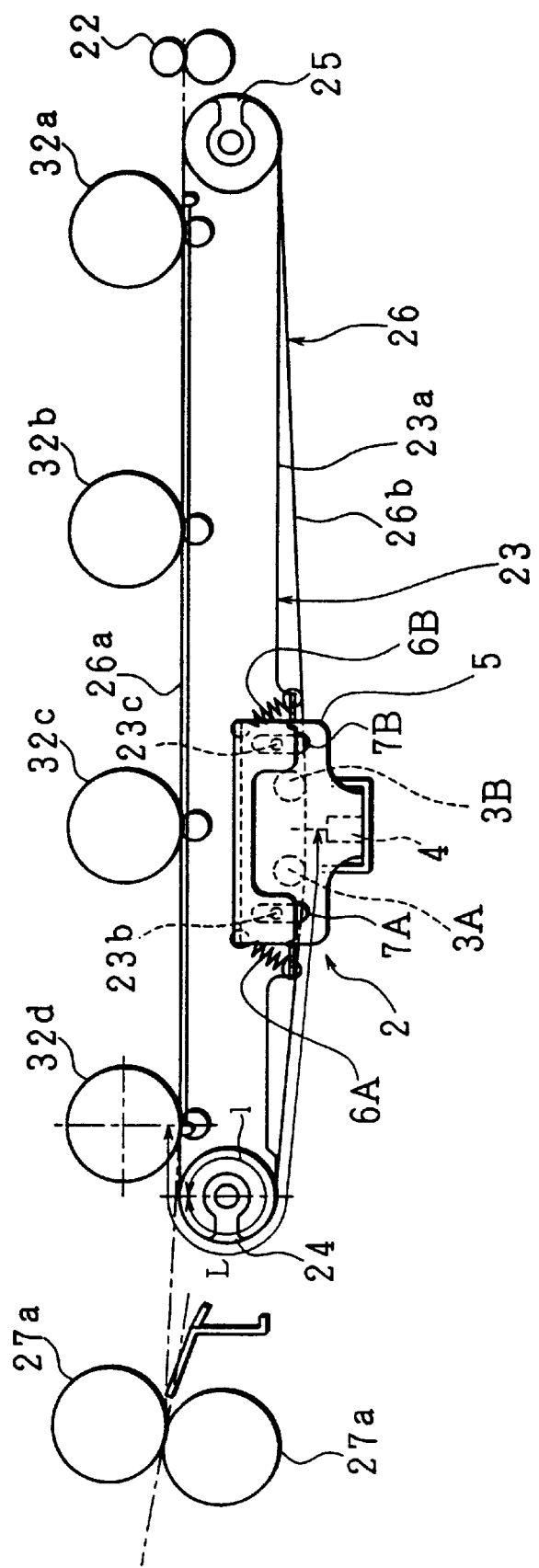
FIG. 9 is a cross-sectional view showing even another example of the arrangement of a pattern image detecting unit and peripherals thereof incorporated in the color digital copying machine.

In a color digital copying machine of the present embodiment, as shown in FIG. 9, a pattern image detecting unit 2 is provided to a suspended segment 26*b* of a transfer and transport belt 26 supported by the drive roller 24 and auxiliary roller 25, the suspended segment 26*b* being opposite to a suspended segment 26a above which are located photosensitive drums 32a through 32d of the image forming section 20.

The pattern image detecting unit 2 includes contact rollers (back surface contact members) 3A and 3B, a pattern image detecting sensor (pattern image detecting means) 4, and a supporting frame (reading stabilizing means) 5 for supporting the contact rollers 3A and 3B and pattern image detecting sensor 4 while maintaining the relative positions (distance and angle) of the contact rollers 3A and 3B and pattern image detecting sensor 4 under certain conditions.

Then, the pattern image detecting unit 2 is connected to a frame 23a of the transfer and transport belt assembly 23 by springs 6A and 6B as energizing members for pressing the pattern image detecting unit 2 downward so that a predetermined tension is applied to the transfer and transport belt 26. Thus, the contact rollers 3A and 3B push the transfer and transport belt 26 downward, and shift the inner surface of the suspended segment 26b of the transfer and transport belt 26 from the contact surface of the transfer and transport belt 26 with the drive roller 24 and auxiliary roller 25.

Moreover, the supporting frame 5 has elongated holes 7A and 7B. The elongated holes 7A and 7B are for guiding the pattern image detecting unit 2 downward, and engage with guide pins 23b and 23c protruding from the frame 23a of the transfer and transport belt assembly 23. This structure enables the pattern image detecting unit 2 to move downward. The frame 23a is a structural component of the transfer and transport belt assembly 23 for supporting the drive roller 24 and auxiliary roller 25.

The pattern image detecting unit 2 is held in a state where a constant tension is applied to the transfer and transport belt 26. This enables the pattern image detecting unit 2 to always apply a suitable tension to the transfer and transport belt 26, and a substantially flat detection area to be surely formed on the transfer and transport belt 26.

Moreover, since the image forming section 20 is provided to the suspended segment 26a of the transfer and transport belt 26 suspended between the drive roller 24 and auxiliary roller 25, and the pattern image detecting unit 2 is provided to the suspended segment 26b, a tension can be applied to the suspended segment 26b on the side of the pattern image detecting unit 2, and the pattern image can be surely detected by the pattern image detecting unit 2, without negatively affecting the suspended segment 26a of the transfer and transport belt 26 on the side of the image forming section 20.

Also, the springs 6A and 6B for applying a predetermined suitable tension to the transfer and transport belt 26 are provided to press both ends of the pattern image detecting unit 2 under the same conditions, and are arranged to press the pattern image detecting unit 2 down toward the elongated holes 7A and 7B while maintaining the pattern image detecting unit 2 horizontally. This presses the contact rollers 3A and 3B to the transfer and transport belt 26 with equal press forces.

As a result, since the contact rollers 3A and 3B are shifted while maintaining the uniform contact with the transfer and transport belt 26, the contact rollers 3A and 3B can apply a predetermined suitable tension to the transfer and transport belt 26. Therefore, the segment of the transfer and transport belt 26 facing the image forming section 20 for forming the images of the four colors does not loosen and can move in a stable manner. Consequently, the image is stabilized, and the substantially flat detection area can be surely formed in which the pattern image formed on the transfer and transport belt 26 is detected.

Besides, the pattern image detecting sensor 4 is disposed opposite to the substantially flat, stable area in such a predetermined relative position that the detection surface (a plane normal to the optical axis of the laser) is parallel to the surface of the transfer and transport belt 26. The springs 6A and 6B press the pattern image detecting unit 2 so that the contact rollers 3A and 3B push the transfer and transport belt 26 toward the pattern image detecting sensor 4 while maintaining the transfer and transport belt 26 parallel to the detection area for the pattern image detecting sensor 4. This enables a suitable tension to be applied to the transfer and transport belt 26 and the substantially flat, stable area of the transfer and transport belt 26 to be surely formed.

In the above arrangement, the following description will discuss further efforts to improve the precision in detecting the pattern image by the pattern image detecting unit 2.

Figure 10:
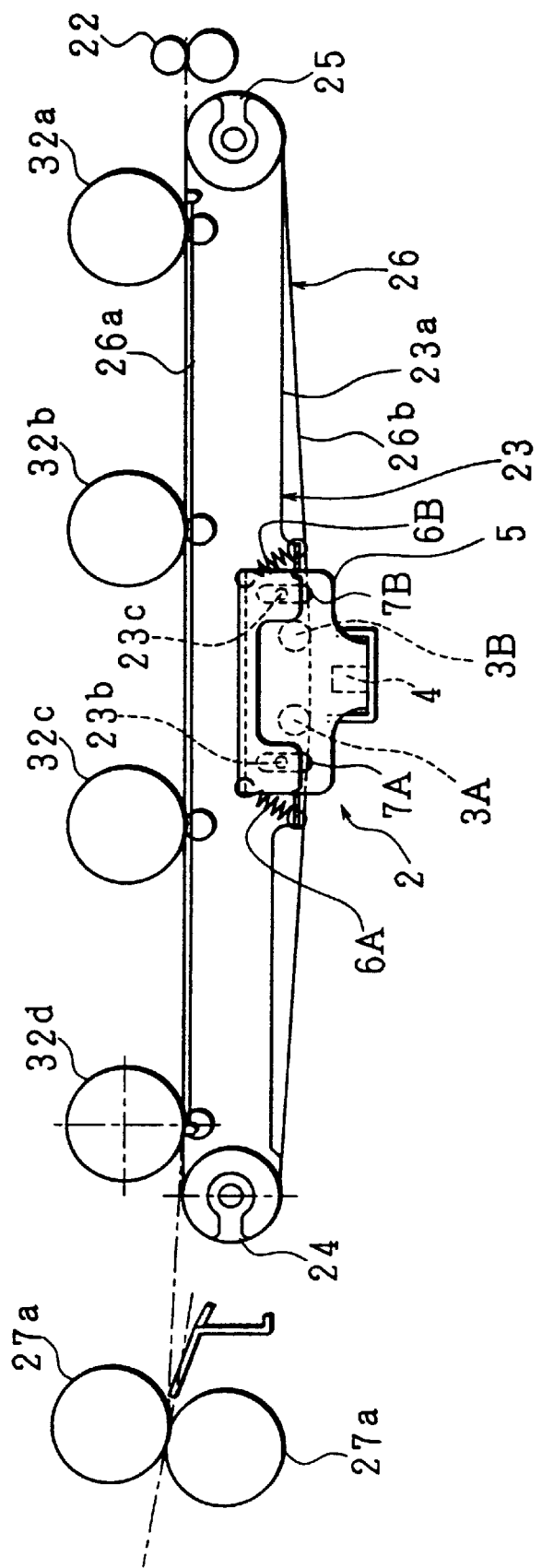
FIG. 10 is a cross-sectional view showing still another example of the arrangement of a pattern image detecting unit and peripherals thereof incorporated in the color digital copying machine.

As shown in FIG. 10, the pattern image detecting unit 2 should be disposed at a substantially equal distance from the drive roller 24 and the auxiliary roller 25 with respect to the suspended segment 26b of the transfer and transport belt 26. In other words, the pattern image detecting unit 2 should be disposed to the middle section of the suspended segment 26b of the transfer and transport belt 26 suspended between the drive roller 24 and the auxiliary roller 25.

This enables the pattern image detecting unit 2 to be shifted while maintaining the pattern image detecting unit 2 parallel to the transfer and transport belt 26 when a predetermined suitable tension is applied to the entire transfer and transport belt 26 by pressing the pattern image detecting unit 2 downward with the springs 6A and 6B. In other words, the pattern image detecting unit 2 is not shifted with one of the two contact rollers 3A and 3B being pressed more strongly than the other; the contact rollers 3A and 3B are pressed onto the surface of the transfer and transport belt 26 with substantially equal forces. This ensures stable movement of the transfer and transport belt 26.

Also, by disposing the pattern image detecting unit 2 at a substantially equal distance from the drive roller 24 and the auxiliary roller 25, substantially equal forces are applied to both ends of the pattern image detecting unit 2. As a result, the pattern image detecting unit 2 can be prevented from inclining and loosening, and detect the pattern image in a stable manner.

Moreover, the vertical shift of the pattern image detecting unit 2, which is required to apply a predetermined tension to the transfer and transport belt 26 can be restrained to a relatively low amount. As a result, the springs 6A and 6B, elongated holes 7A and 7B, the guide pins 23b and 23c, etc. that form a tension application assembly for applying a tension to the transfer and transport belt 26 can be made in a compact size.

Figure 11:
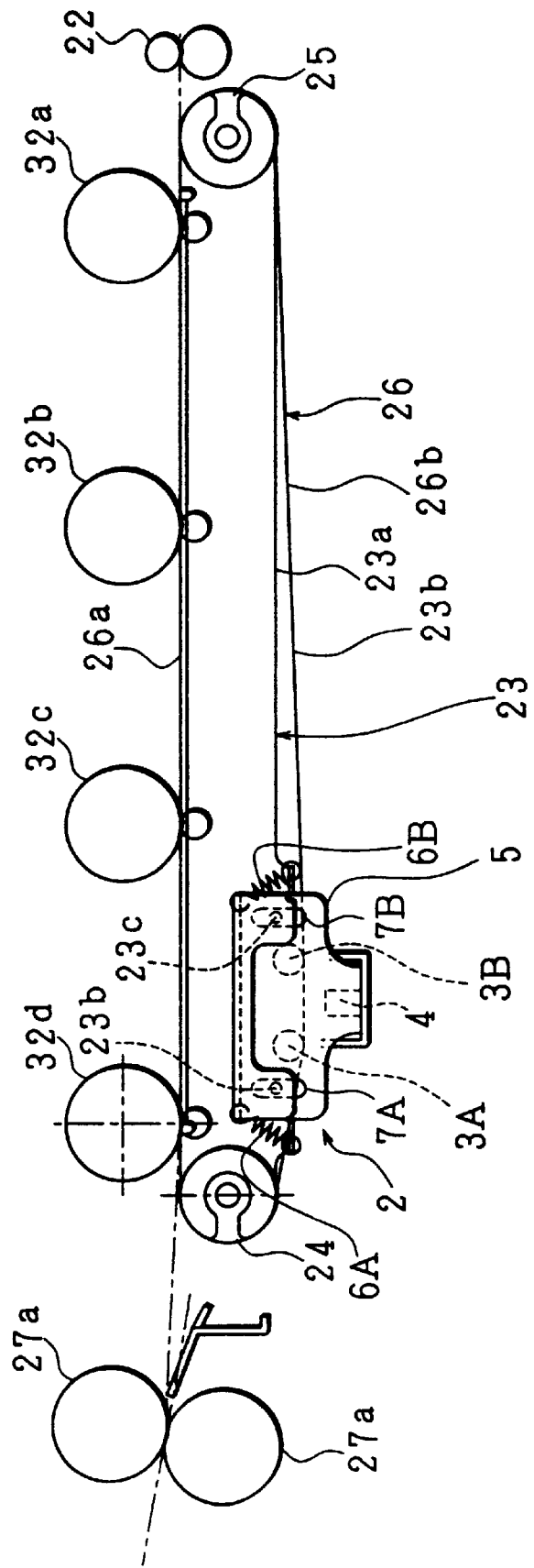
FIG. 11 is a cross-sectional view showing a further example of the arrangement of a pattern image detecting unit and peripherals thereof incorporated in the color digital copying machine.

Incidentally, the pattern image detecting unit 2 may be disposed near either the drive roller 24 or the auxiliary roller 25 as shown in FIG. 11.

This enables the vertical shift of the pattern image detecting unit 2 to be restrained to the lowest amount possible when a predetermined suitable tension is applied to the entire transfer and transport belt 26 by shifting the pattern image detecting unit 2 downward with the springs 6A and 6B. Therefore, the empty space of the transfer and transport belt assembly 23 that is required to shift the transfer and transport belt 26 can be made in the smallest size possible, and the tension application assembly can also be made in a compact size.

Next, based on results of an experiment, the following description will discuss changes in the vibration (greatest amplitude) of the transfer and transport belt 26 caused by the tension applied to the transfer and transport belt 26 by shifting the pattern image detecting unit 2.

In some instances, a change in the greatest amplitude of the transfer and transport belt 26 caused by the tension applied to the transfer and transport belt 26 obstructs the pattern image detecting sensor 4 from detecting the pattern image and outputting detection signals thereof precisely, and disables highly precise control according to the detection signals.

Especially, in order that the pattern image detecting sensor 4 corrects the image formation starting position and detects the line width of an image, in, for example, a laser pickup sensor arranged as shown in FIG. 6, the laser beam radiating from the laser beam source 91 needs have a beam diameter of 10 $\mu$m. In such a case, since the normally reflected laser is detected, the angle allows for little deviation. Since the lens depth is short, the detection distance again allows for little deviation.

Therefore, tension is preferably applied to the transfer and transport belt 26 so that the transfer and transport belt 26 does not vibrate in the substantially flat detection area of the transfer and transport belt 26 on which the pattern image is formed and that stable movement of the transfer and transport belt 26 is ensured.

Next, the following description will discuss the actual measurement of the vibration of the surface of the moving transfer and transport belt 26 on which the detection is made by the pattern image detecting sensor 4.

Figure 12:
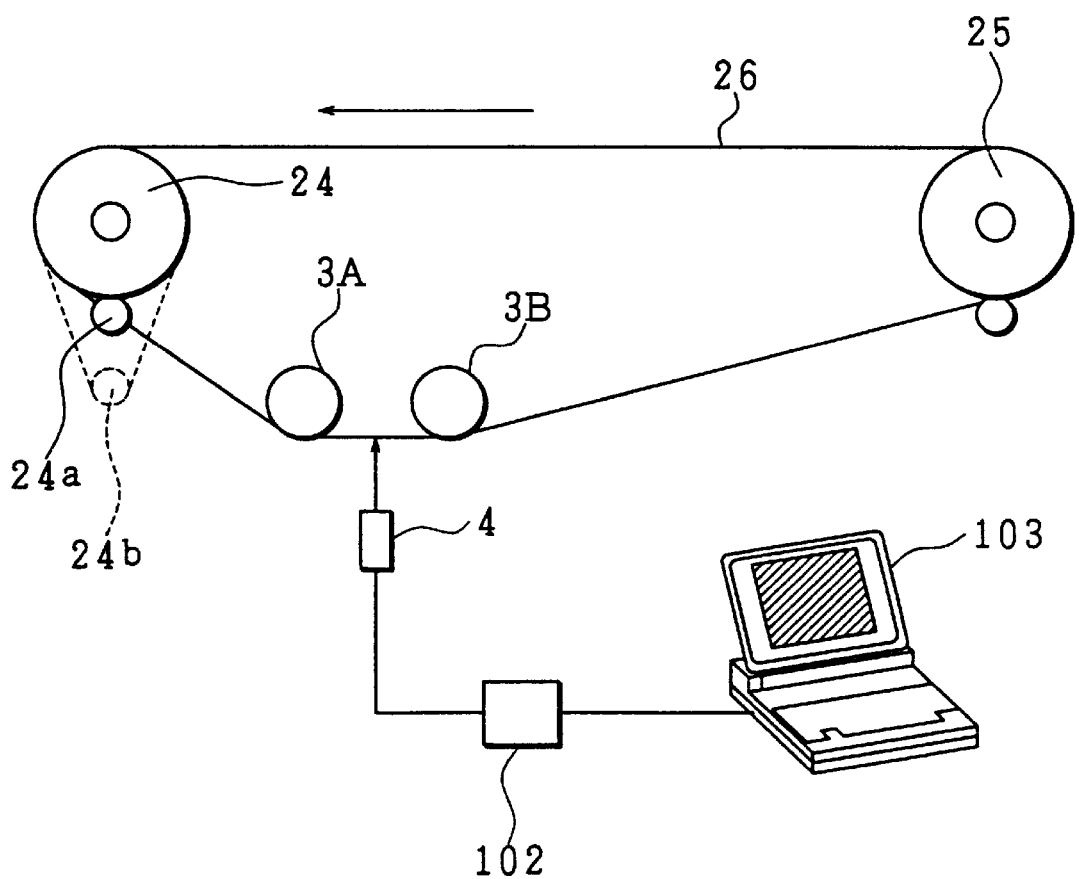
FIG. 12 is a schematic view illustrating how to measure a vibration waveform of a transfer and transport belt of the color digital copying machine.

As shown in FIG. 12, the drive waveform of a segment of the moving transfer and transport belt 26 between the contact rollers 3A and 3B was fed into a personal computer (PC card type data collection system NR-110) 103 by a CCD laser shift sensor (LK-2000) 102 so as to measure the greatest amplitude of the transfer and transport belt 26 at the midpoint between the contact rollers 3A and 3B while changing the positions of the contact rollers 3A and 3B and the forces applied to the contact rollers 3A and 3B.

In the measurement, a modified polyimide belt was used as a transfer and transport belt 26. Used as a drive roller 24 was a roller, having a diameter of 33.6 mm, which is driven by a drive axis 24a of a drive source when driven by a gear and which is driven by a drive axis 24b of the drive source when driven by a belt. Rollers each having a diameter of 12.0 mm were used as the contact rollers 3A and 3B, and placed at a distance of 20 mm from the pattern image detecting sensor 4. Incidentally, the pattern image detecting sensor 4 is arranged as shown in FIG. 6 and is further arranged so as to produce a beam having a diameter of 10 $\mu$m.

Table 2 shows results of the measurement. Note that the standard position in Table 2 refers to a position where the transfer and transport belt 26 does not experience any geometrical loosening resulting from the shift of the contact rollers 3A and 3B. The standard position is geometrically determined by the diameter of the drive roller 24, diameter of the auxiliary roller 25, distance between the rotation axis of the drive roller 24 and that of the auxiliary roller 25, inner circumference length of the transfer and transport belt 26, and positions of the contact rollers 3A and 3B.

TABLE 2

| Positions of Contact Rollers 3A and 3B | Tension Applied to Transfer and Transport Belt 26 (gf) | Transfer and Transport Belt ($\mu$m) |
|---|---|---|
| Standard Positions | 0 | 70 |
| 2 mm above Standard | 0 | 103 |

TABLE 2-continued

| Positions of Contact Rollers 3A and 3B | Tension Applied to Transfer and Transport Belt 26 (gf) | Transfer and Transport Belt ($\mu$m) |
|---|---|---|
| Positions 4 mm above Standard Positions | 0 | 105 |
| Standard Positions | 250 | 68 |
| Standard Positions | 500 | 51 |

The tension applied to the transfer and transport belt 26 shown in Table 2 does not include the tension caused by the weight (320 g) of the contact rollers 3A and 3B.

It is understood from Table 2 that the greatest amplitude of the transfer and transport belt 26 increases with the increase in the upward shift of the contact rollers 3A and 3B and that the greatest amplitude of the transfer and transport belt 26 decreases with the increase in the tension applied to the transfer and transport belt 26. Incidentally, in that case, although the tension caused by the springs 6A and 6B and that caused by the weight of the springs 6A and 6B are applied to the transfer and transport belt 26, Table 2 shows only the increases in tension due to the energizing force of the springs 6A and 6B.

In the same manner, the vibration of the detection surface (detection area) of the transfer and transport belt 26 for the pattern image detecting sensor 4 and the slipping of the drive roller 24 on the transfer and transport belt 26 were examined by changing the additional load applied by the contact rollers 3A and 3B onto the transfer and transport belt 26.

TABLE 3

| Additional Load Applied to Transfer and Transport belt 26 (g) | Vibration of Detection Area of Transfer and Transport Belt 26 | Slipping of Drive Roller 24 On Transfer and Transport Belt 26 |
|---|---|---|
| 50 | Observed | Not Observed |
| 100 | Observed | Not Observed |
| 150 | Observed yet tolerable | Not Observed |
| 200 | Not Observed | Not Observed |
| 300 | Not Observed | Not Observed |
| 400 | Not Observed | Not Observed |
| 500 | Not Observed | Observed yet tolerable |

According to the results of the experiment, the increment in the tension applied to the transfer and transport belt 26 by the press force of the contact rollers 3A and 3B is preferably 180 g or greater, and more preferably 200 g or greater, so that the transfer and transport belt 26 can maintain the distance from the pattern image detecting sensor 4 without becoming loose in the area where the pattern image detecting sensor 4 carries out the detection. This enables the pattern image detecting sensor 4 to generate stable detection signals and the amount of the vertical vibration of the transfer and transport belt 26 and pattern image detecting unit 2 to be restrained to a minimum amount.

The upper limit of the increment in the tension applied to the transfer and transport belt 26 by the press force of the contact rollers 3A and 3B should be specified considering the strength of the transfer and transport belt 26, the stability in the movement of the transfer and transport belt 26 driven by the drive roller 24 and auxiliary roller 25, the load on the drive source for the drive roller 24, and the like, being preferably 400 g or smaller. This can prevent unnecessarily large tensions from being applied to the transfer and transport belt 26. As a result, the drive roller 24 can be prevented from slipping on the transfer and transport belt 26, and surely transmits the drive force of the drive roller 24 to the transfer and transport belt 26. Therefore, the transfer and transport belt 26 can be moved in a predetermined direction in a stable state.

Accordingly, the increment in the tension applied to the transfer and transport belt 26 by the press force of the contact rollers 3A and 3B is preferably in the range of 180 g to 400 g, and more preferably in the range of 200 g to 400 g. Incidentally, to render the tension applied to the transfer and transport belt 26 in the above range, the energizing force by the springs 6A and 6B should be adjusted.

Figure 13:
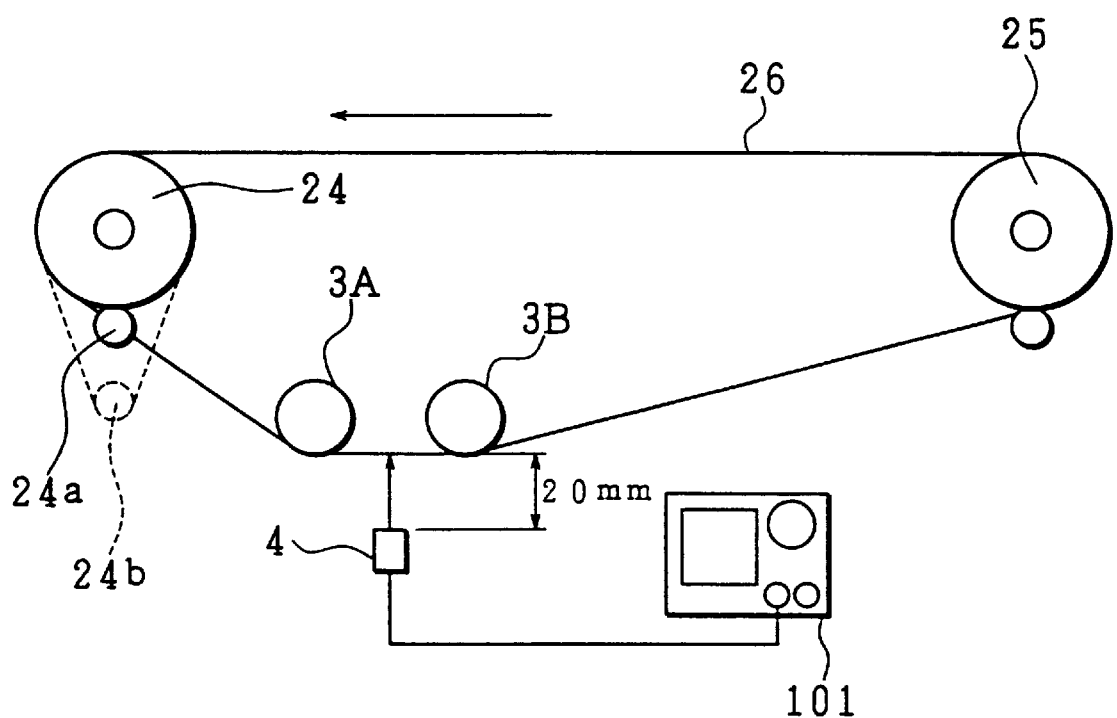
FIG. 13 is a schematic view showing a measuring device for measuring an output waveform of a pattern image detecting sensor of the pattern image detecting unit.

Next, the output characteristics of the pattern image detecting sensor 4 were examined with respect to the distance from the surface of the detected object to the detection surface of the pattern image detecting sensor 4. Changes in output with the distance from the surface of the transfer and transport belt 26 to the detection surface of the pattern image detecting sensor 4 were measured, using a digital oscilloscope (LC534AL) 101 as shown in FIG. 13. Incidentally, the contact rollers 3A and 3B, pattern image detecting sensor 4, drive roller 24, and transfer and transport belt 26 shown FIG. 13 are the same as those shown in FIG. 12.

Figure 14:
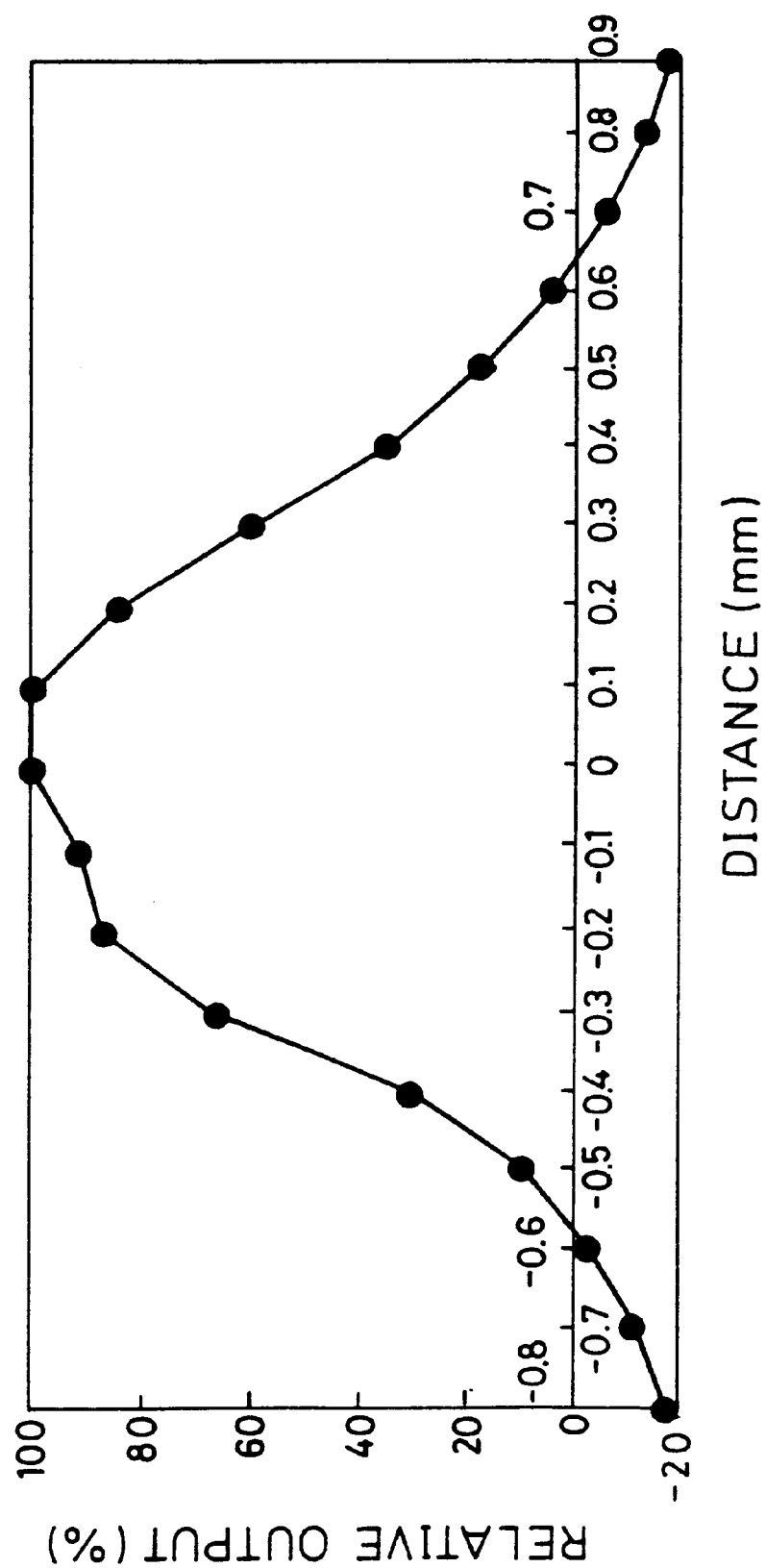
FIG. 14 is a graph showing how the relative difference in output voltage from a pattern image detecting sensor between a non-toner segment and toner segment varies with the distance between the pattern image detecting sensor and the surface of the transfer and transport belt.
Figure 15:
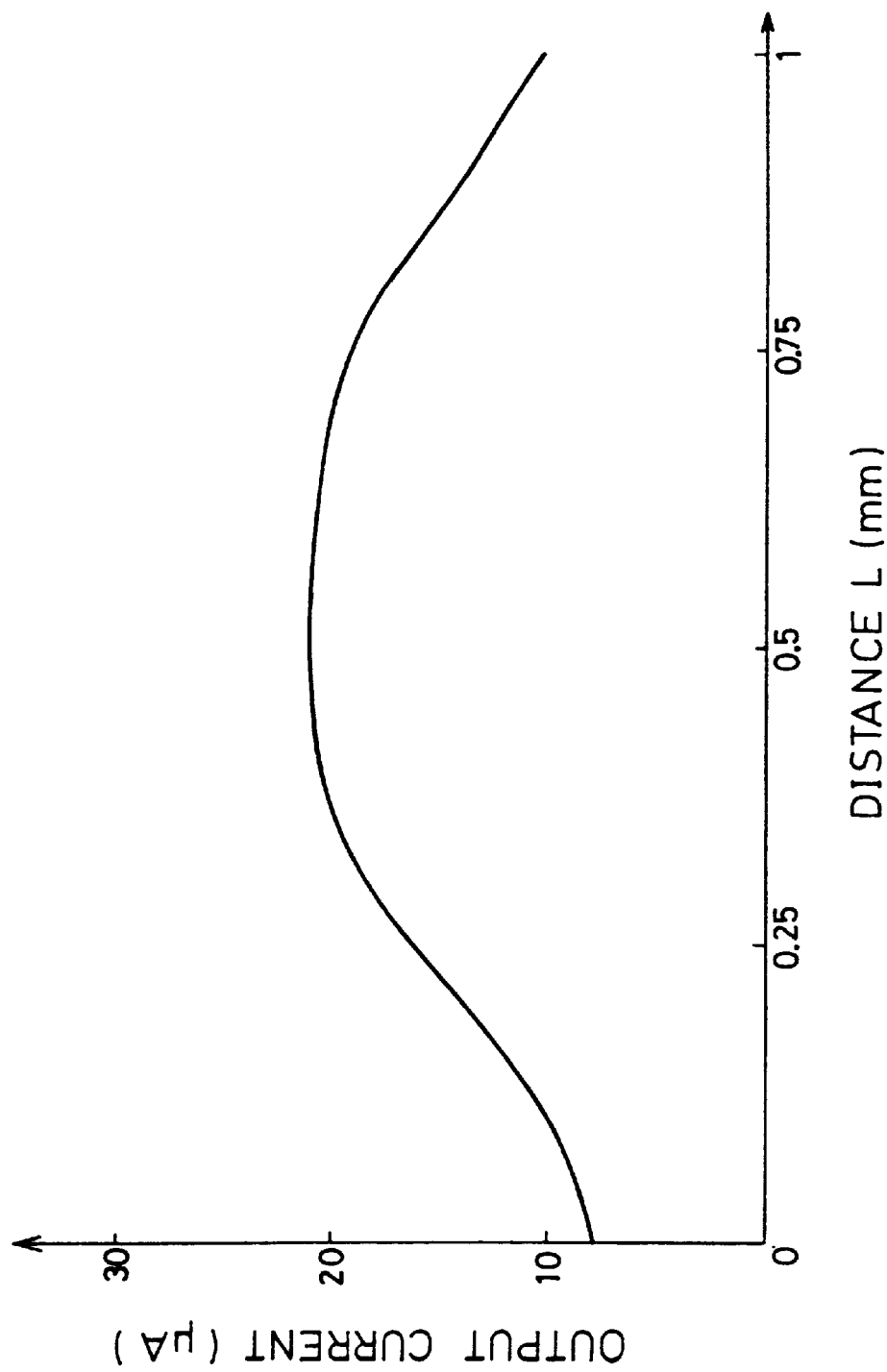
FIG. 15 is a graph showing how the output current from a pattern image detecting sensor varies with the distance between the pattern image detecting sensor and the surface of the detected object.
Figure 16:
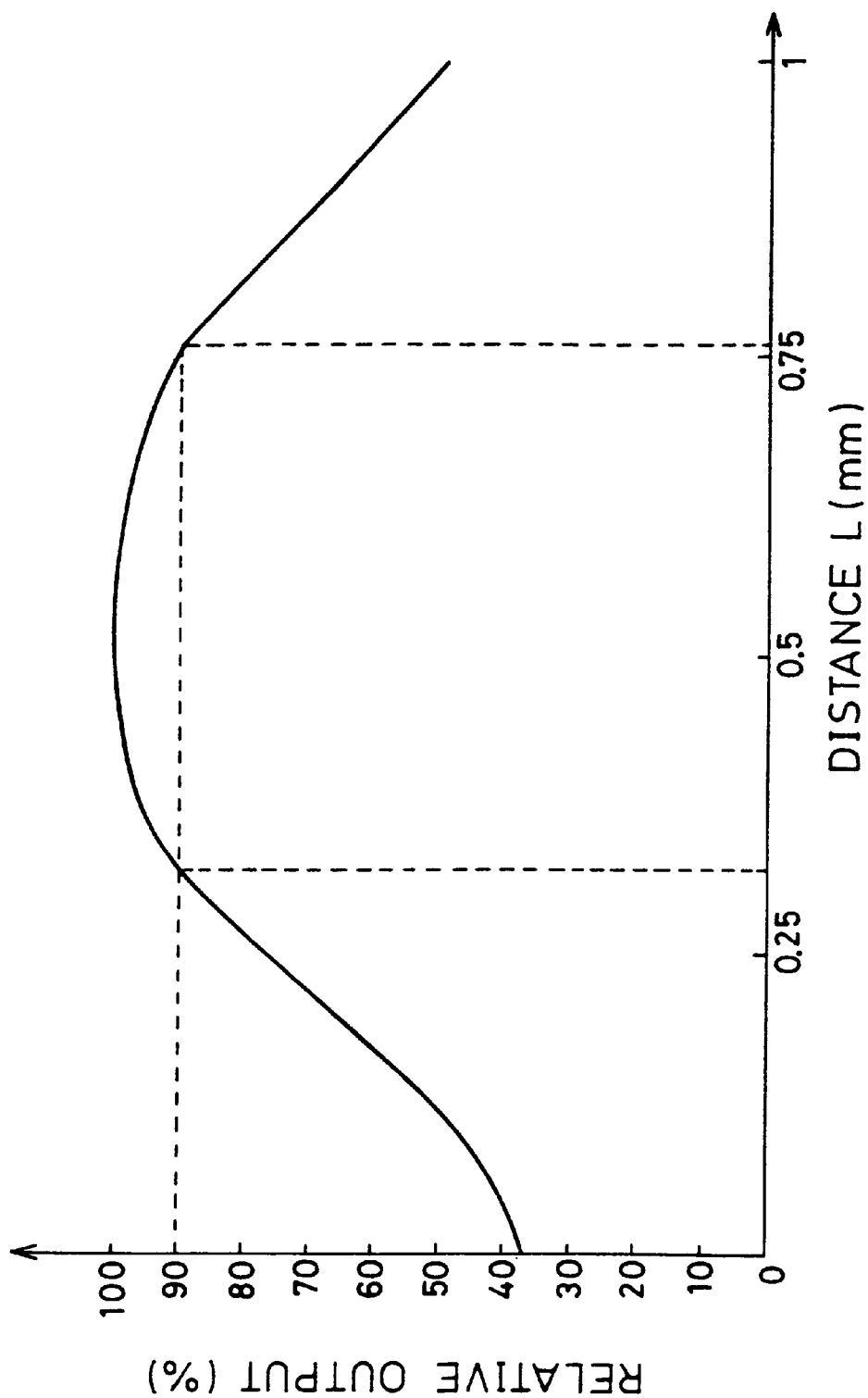
FIG. 16 is a graph showing how the relative output current from a pattern image detecting sensor varies with the distance between the pattern image detecting sensor and the surface of the detected object.

Results of the measurement are shown in Table 4 and FIG. 14 through FIG. 16.

TABLE 4

| Distance from Pattern Image Detection Sensor 4 (mm) | Output Voltage of Pattern Image Detection Sensor 4 for Non-Toner Segment (V) | Difference in Output Voltage Between Non-Toner Segment and Toner Segment (V) | Relative Difference in Output Voltage (%) |
|---|---|---|---|
| −0.8 | 4.863 | −0.093 | −17.222 |
| −0.7 | 4.831 | −0.061 | −11.296 |
| −0.6 | 4.783 | −0.013 | −2.407 |
| −0.5 | 4.717 | 0.053 | 9.815 |
| −0.4 | 4.605 | 0.165 | 30.556 |
| −0.3 | 4.411 | 0.359 | 66.481 |
| −0.2 | 4.301 | 0.469 | 86.852 |
| −0.1 | 4.278 | 0.492 | 91.111 |
| 0.0 | 4.230 | 0.540 | 100.000 |
| 0.1 | 4.230 | 0.540 | 100.000 |
| 0.2 | 4.315 | 0.455 | 84.259 |
| 0.3 | 4.445 | 0.325 | 60.185 |
| 0.4 | 4.580 | 0.190 | 35.185 |
| 0.5 | 4.674 | 0.096 | 17.778 |
| 0.6 | 4.749 | 0.021 | 3.889 |
| 0.7 | 4.802 | −0.032 | −5.926 |
| 0.8 | 4.843 | −0.073 | −13.519 |
| 0.9 | 4.866 | −0.096 | −17.778 |

FIG. 4 shows the output voltage of the pattern image detecting sensor 4 with respect to a transfer and transport belt 26 made of a modified polyimide, the difference between the output voltage of the pattern image detecting sensor 4 with respect to a transfer and transport belt 26 made of a modified polyimide and the output voltage (4.77V) of the pattern image detecting sensor 4 with respect to a toner applied segment, and the relative output of the output voltage difference (set to 1 when the distance from the pattern image detecting sensor 4 is 0), when the distance from the surface of the transfer and transport belt 26 to the detection surface of the pattern image detecting sensor 4 was changed. FIG. 14 is a graph showing changes in the relative output of the output voltage difference with respect to the distance from the surface of the transfer and transport belt 26 to the detection surface of the pattern image detecting sensor 4 in Table 4.

In Table 4 and FIG. 14, the distance from the surface of the transfer and transport belt 26 to the detection surface of the pattern image detecting sensor 4 is denoted by the difference from a standard value of 20 mm.

It is understood from the results shown in Table 4 and FIG. 14 that the distance between the pattern image detecting sensor 4 and the detected object should be ±0.2 mm to produce a relative output of the output voltage difference of 85% or greater.

A sheet on which aluminum is vaporized was used as the detected object to measure the output current from the pattern image detecting sensor 4 and the relative output (set to 1 when the distance between the detection surface of the pattern image detecting sensor 4 and the surface of the aluminum vaporized sheet was 0.5 mm) of the foregoing output current while changing the distance, L, between the detection surface of the pattern image detecting sensor 4 and the surface of the aluminum vaporized sheet.

It is understood from the results shown in FIGS. 15 and 16 that the distance, L, between the pattern image detecting sensor 4 and the detected object should be ±0.2 mm to produce a relative output of the output current of 90% or greater.

It is understood from the relationship between the detection desistance and output from the pattern image detecting sensor 4 that if the greatest amplitude of the transfer and transport belt 26 is 0.1 mm or less, the relative output from the pattern image detecting sensor 4 is at a satisfactory level of 90% or greater.

Figure 17:
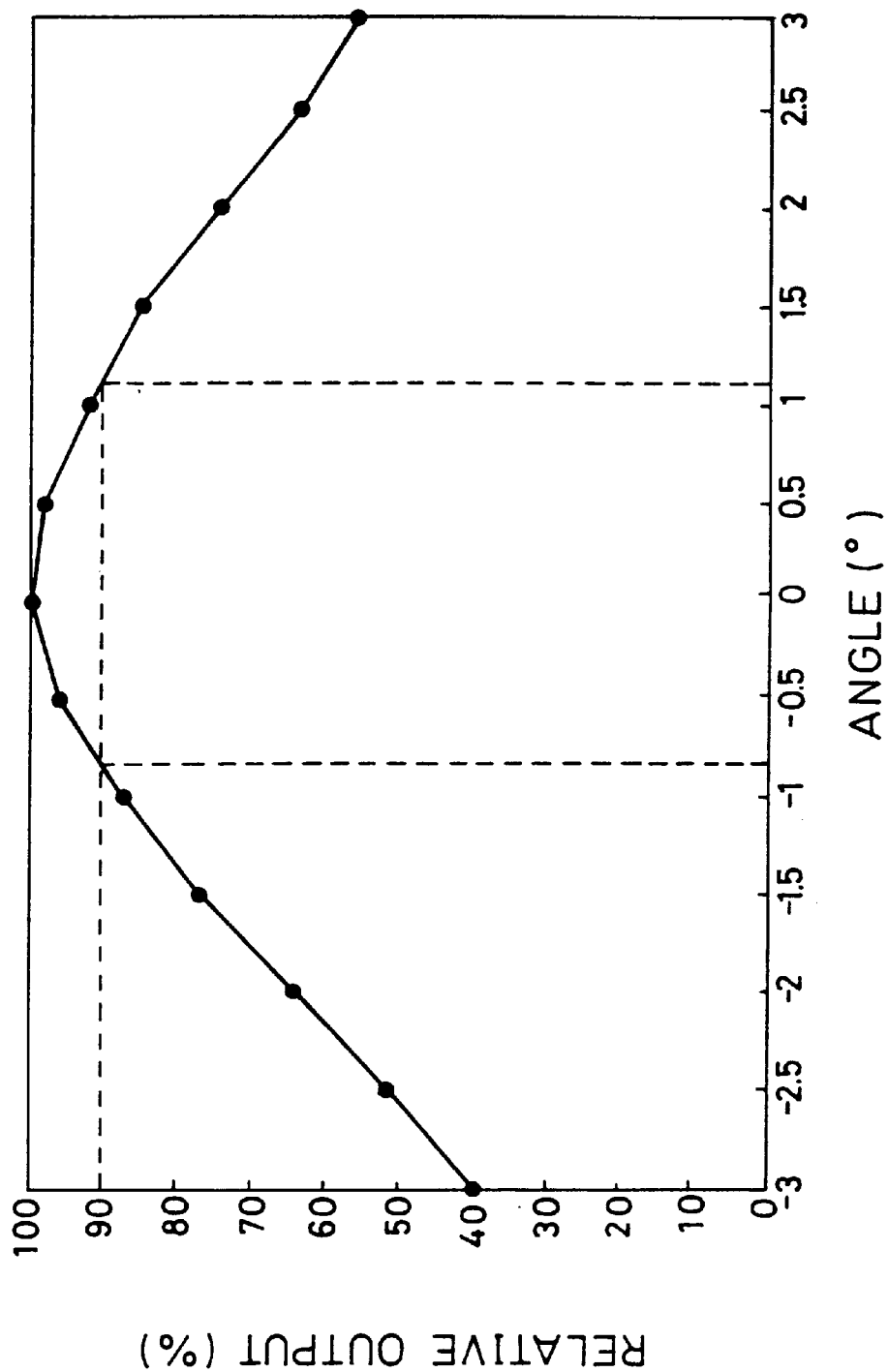
FIG. 17 is a graph showing how the relative output from a pattern image detecting sensor varies with the angle of the pattern image detecting sensor when an aluminum vaporized material is used as a detection sample.
Figure 18:
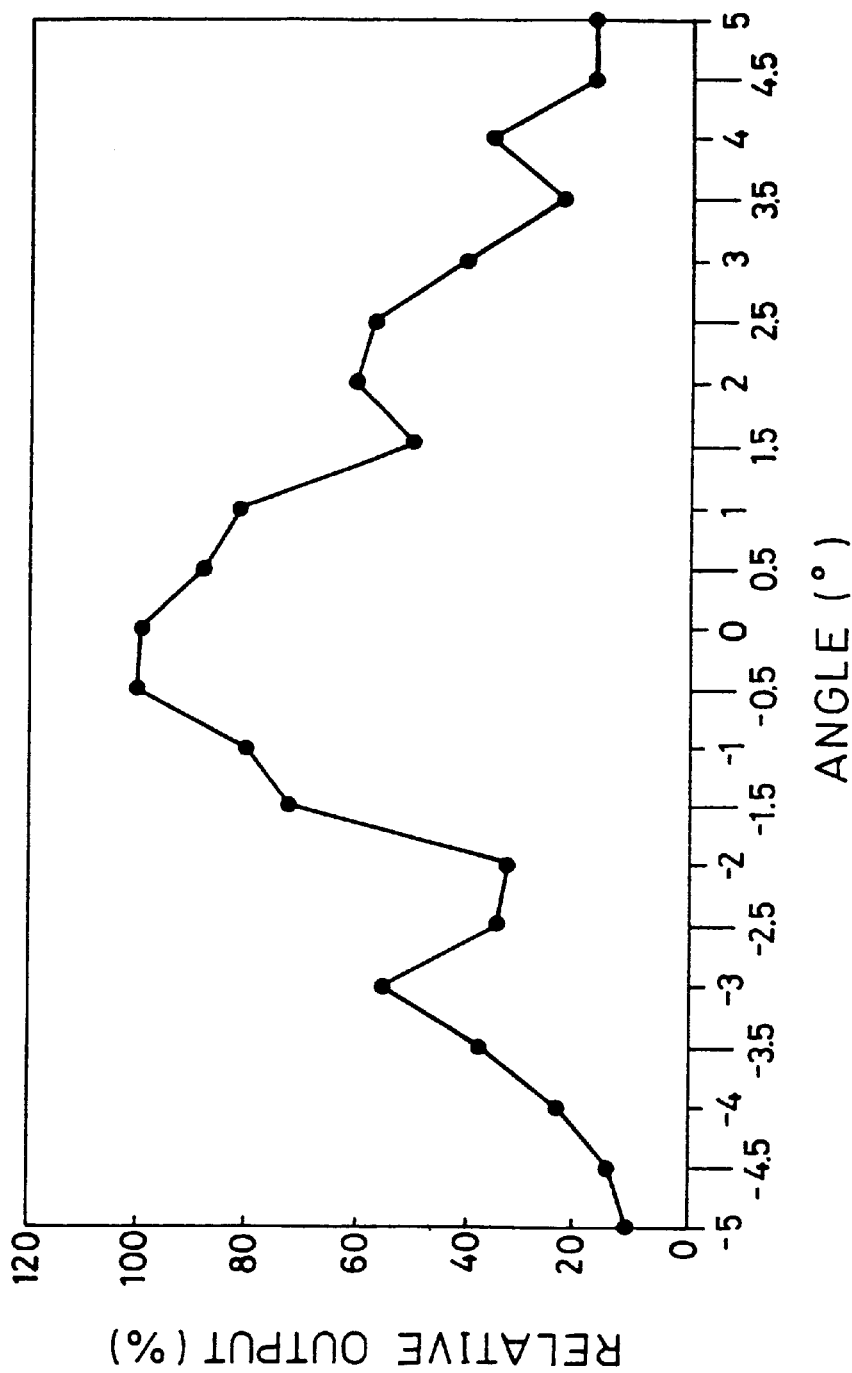
FIG. 18 is a graph showing how the relative output from a pattern image detecting sensor varies with the angle of the pattern image detecting sensor when a modified polyimide is used as a detection sample.

Moreover, changes in output with the angle of the pattern image detecting sensor 4 (the inclination of the detection surface, which is vertical to the optical axis of the laser, of the pattern image detecting sensor 4 to the detected surface of the detection sample) were measured using the measuring device shown in FIG. 13 in the same manner as in the above case of measuring changes in output to the distance from the pattern image detecting sensor 4. FIGS. 17 and 18 show relative outputs (set to 1 when the angle of the pattern image detecting sensor 4 is 0°), using an aluminum vaporized material and a modified polyimide as detection samples.

It is understood from the relationship of the inclination of the transfer and transport belt 26 and the output from the pattern image detecting sensor 4 shown in FIGS. 17 and 18 that the inclination of the transfer and transport belt 26 (inclination of the pattern image detecting sensor 4 to the detection surface) within a range of ±1° can ensure a satisfactory level of relative output of 90% or greater. A calculation based on the distance between the contact rollers 3A and 3B shows that the inclination of the transfer and transport belt 26 is 0.19° at the places where the transfer and transport belt 26 is in contact with the contact rollers 3A and 3B when the greatest amplitude of the transfer and transport belt 26 is 0.1 mm. Therefore, it is understood that if the greatest amplitude of the transfer and transport belt 26 is 0.1 mm or less, the inclination of the transfer and transport belt 26 also is at a satisfactory level.

Next, the following description will discuss the detection position where the pattern image detecting sensor 4 conducts the detection of the pattern image on the transfer and transport belt 26.

The transfer and transport belt 26 is susceptible to a cyclic drive irregularity due to the eccentricity of the drive roller 24 for moving the transfer and transport belt 26. Therefore, the distance, L (see FIG. 9), between the place where the pattern image is formed on the transfer and transport belt 26 by the image forming section 20 and the place where the pattern image formed on the transfer and transport belt 26 is detected by the pattern image detecting sensor 4 should be specified to be an integral multiple of the circumference of the drive roller 24 so that the pattern image is always detected at a specific point (range) in this predetermined cyclic drive irregularity. This enables the cycle of the drive irregularity of the drive source for driving the transfer and transport belt 26 to be maintained at a constant value, and the detection of the pattern image to be conducted by the pattern image detecting sensor 4 in a stable manner.

Figure 19:
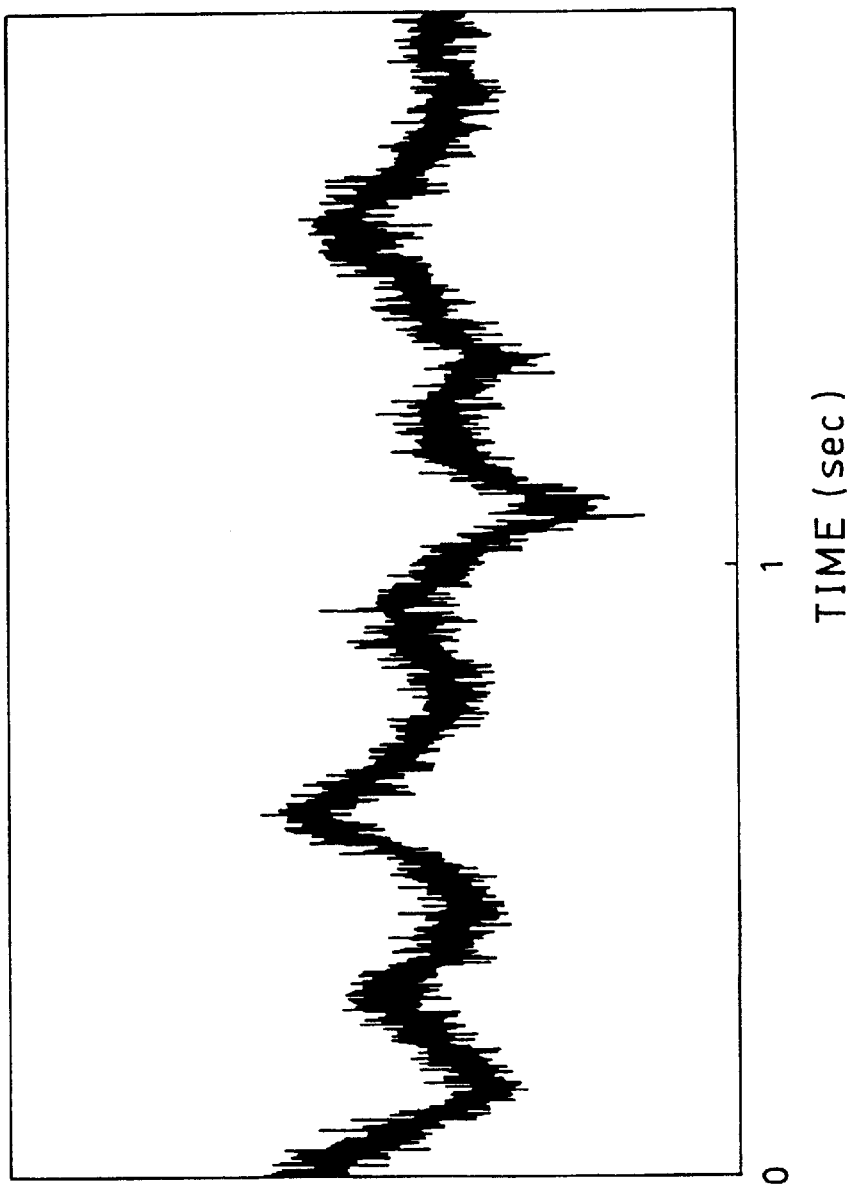
FIG. 19 is a waveform chart showing a vibration waveform of a transfer and transport belt.
Figure 20:
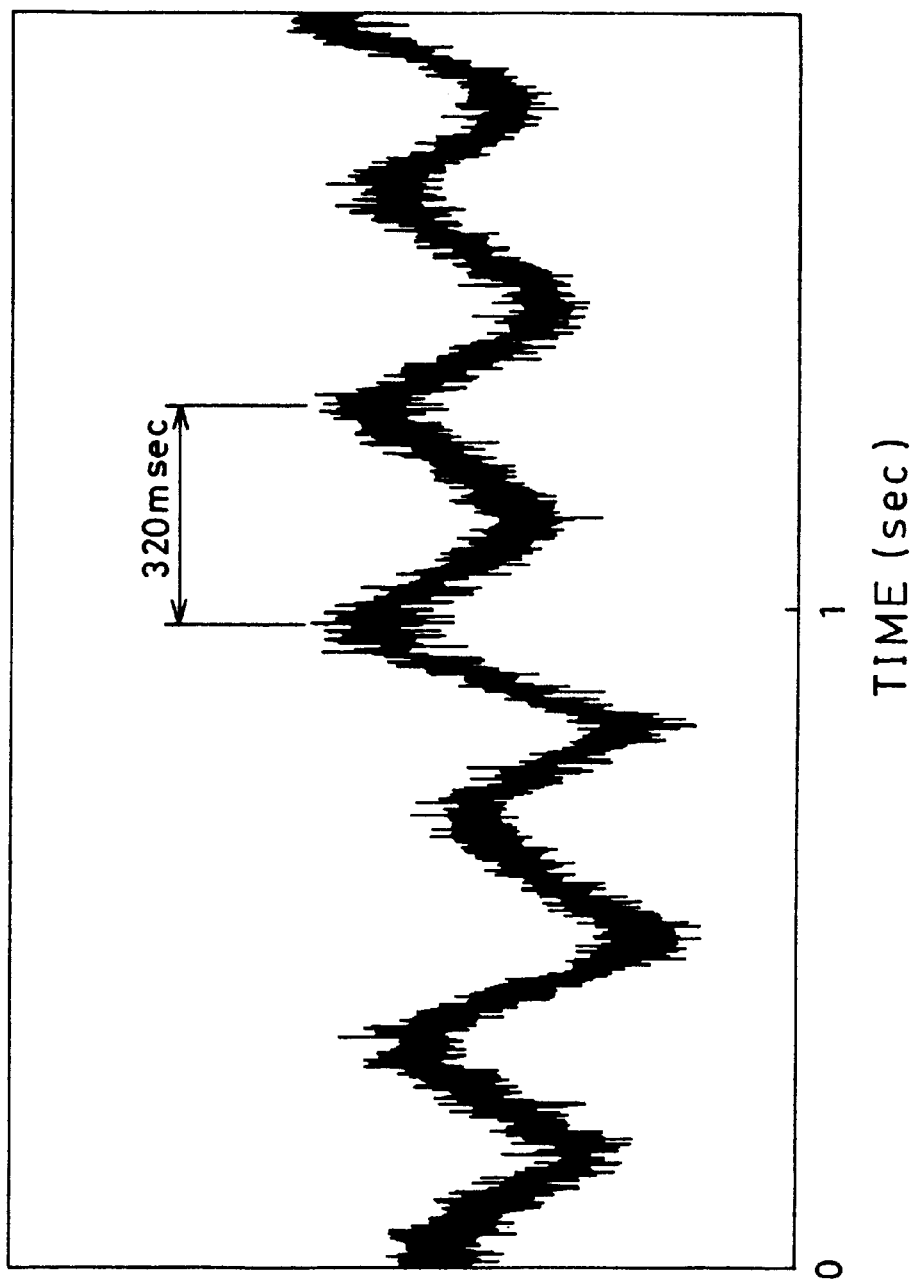
FIG. 20 is a waveform chart showing a vibration waveform of a transfer and transport belt when contact rollers are pressed against the transfer and transport belt.

Next, the vibration waveform of the transfer and transport belt 26 was measured using the measuring device shown in FIG. 13. The obtained results are shown in FIGS. 19 and 20. From these figures, it is understood that the transfer and transport belt 26 vibrates at a cycle of 320 msec, which is equal to the rotation cycle of the contact rollers 3A and 3B. Incidentally FIG. 19 shows a vibration waveform when the load applied to the transfer and transport belt 26 by the contact rollers 3A and 3B is the weight (320 g) of the contact rollers 3A and 3B alone, while FIG. 20 shows a waveform when the total load applied to the transfer and transport belt 26 by the contact rollers 3A and 3B exceeds the weight of the contact rollers 3A and 3B by 250 g.

In this manner, the eccentricity of the contact rollers 3A and 3B that are driven to rotate by the contact thereof with the back surface of the transfer and transport belt 26 also changes the velocity of the transfer and transport belt 26 at a rotation cycle of the contact rollers 3A and 3B. Therefore, the eccentricity of the contact rollers 3A and 3B is preferably restrained as much as possible.

Moreover, if the angle of the pattern image detecting sensor 4 is specified under the aforementioned conditions, such as the level of the tension and eccentricity of the contact rollers 3A and 3B, so that the inclination to the surface of the transfer and transport belt 26 is within a predetermined range, preferably within 1°, the pattern image detecting sensor 4 can generate stable output.

Incidentally, the back surface contact member 3 having the flat smooth surface 3a used in Embodiment 1 can be used as a back surface contact member instead of the contact rollers 3A and 3B.

The first image forming apparatus in accordance with the present invention, as discussed so far, is an image forming apparatus including:

an endless belt suspended between a plurality of supporting members;

image forming means for forming a pattern image on the endless belt; and pattern image reading means for reading the pattern image, wherein the pattern image reading means is arranged so as to read the surface of a suspended segment, of the endless belt, suspended between the supporting members, and a back surface contact member that is in contact with a back surface of a reading area where the pattern image reading means reads the pattern image on the surface of the endless belt is provided so as to render the reading area flat and stable.

With the arrangement, the reading area is flat and stable owing to the back surface contact member that is in contact with the back surface of the reading area on the surface of the endless belt. Therefore, the pattern image on the endless belt is read in the flat, stable area of the endless belt.

This can maintain the relative positions of the pattern image reading means and the endless belt on which the pattern image, i.e. detection object, is formed, and always produce precise reading results (detection signals) in a stable manner.

In addition, if the image forming conditions are controlled using the reading results of the pattern image reading means, the output of high quality images is possible in a stable manner.

The second image forming apparatus in accordance with the present invention, as discussed so far, incorporates all the features of the first image forming apparatus, and is characterized in that the back surface contact member has a flat surface that is in surface-to-surface contact with the back surface of the reading area.

With the arrangement, even a single back surface contact member can render a segment of the endless belt that is in surface-to-surface contact with the flat surface to be flat and stable. This further ensures that the pattern image reading means always produces precise reading results in a stable manner.

In addition, if the image forming conditions are controlled using the reading results of the pattern image reading means, the output of high quality images is possible in a more stable manner.

The third image forming apparatus in accordance with the present invention, as discussed so far, incorporates all the features of the first or second image forming apparatus, and is characterized in that the back surface contact member is in contact at a plurality of places with the back surface of the reading area.

With the arrangement, since the back surface contact member is in contact at a plurality of places with the back surface of the reading area, the back surface contact member can form a flat, stable area of the endless belt between those contact places. This ensures that the pattern image reading means always produces precise reading results in a stable manner even with reduced contact areas between the back surface contact member and the endless belt. Reducing contact areas between the back surface contact member and the endless belt restrains loads on the movement of the endless belt, and results in reduced irregularity in the movement of the endless belt. Consequently, the output of homogeneous, high quality images becomes possible.

The fourth image forming apparatus in accordance with the present invention, as discussed so far, incorporates all the features of the third image forming apparatus, and is characterized in that the back surface contact member is constituted by a plurality of rollers provided so as to be rotatable while being in contact with a back surface of the reading area.

With the arrangement, the negative effect of the back surface contact member on the movement of the endless belt can be restrained, and the endless belt can move in a stable manner. Besides, since the back surface contact member can be prevented from scratching the contact surface of the endless belt, the endless belt can be prevented from wearing, and the stable movement of the endless belt can be maintained. Consequently, the output of high quality images becomes possible in a more stable manner.

The fifth image forming apparatus in accordance with the present invention, as discussed so far, incorporates all the features of the fourth image forming apparatus, and is characterized in that the back surface contact member is provided so as to shift an inner surface of the suspended segment from a contact surface that is in contact with the supporting members.

With the arrangement, since the inner surface of the suspended segment of the endless belt is shifted from the contact surface that is in contact with the supporting members, the tension of the endless belt can be increased. This makes it possible to maintain the reading area of the endless belt flat in a more stable manner, and stabilizes the movement of the endless belt. As a result, the quality of the output image can be always maintained at a high level. For example, a color copying machine can be realised that can reproduce original images faithfully in a stable manner. As a result of this, the output of high quality images becomes possible in a more stable manner.

The sixth image forming apparatus in accordance with the present invention, as discussed so far, incorporates all the features of any one of the first through fifth image forming apparatuses, and is characterized in that an energizing member for energizing the back surface contact member toward the pattern image reading means is further provided.

With the arrangement, since the back surface contact member is pressed onto the suspended segment of the endless belt, the tension of the endless belt can be further increased. As a result, the quality of the output image can be always maintained at a high level. For example, a color copying machine can be realised that can reproduce original images faithfully in a stable manner. As a result of this, the output of high quality images becomes possible in a more stable manner.

The seventh image forming apparatus in accordance with the present invention, as discussed so far, incorporates all the features of any one of the first through sixth image forming apparatuses, and is characterized in that the endless belt can carry and transport a recording medium on a surface thereof, the image forming means can form an image on the recording medium, and an image forming condition control means for controlling conditions for the image forming means to form an image on the recording medium according to the reading results by the pattern image reading means.

With the arrangement, since feedback control, for example registration control and process control, of the image forming conditions is carried out according to stable and precise reading results, the image forming conditions can be controlled in a more precise manner. As a result, the quality of the output image can be always maintained at a high level. For example, a color copying machine can be realised that can reproduce original images faithfully in a stable manner. As a result of this, the quality of the output image can be always maintained at a high level.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An image forming apparatus, comprising:
   an endless belt moving in a predetermined direction, a pattern image being formed on the endless belt;
   pattern image reading means for reading the pattern image;
   reading stabilizing means, provided in contact with a back surface of the endless belt and including a back surface contact member for causing an area in which the pattern image is formed to be substantially flat when the pattern image reading means reads the pattern image, for maintaining the relative positions of the back surface contact member and the pattern image reading means in a predetermined state wherein in the reading stabilizing means, the back surface contact member and the pattern image reading means are supported by a common supporting member.

2. The image forming apparatus as defined in claim 1, wherein the back surface contact member has a flat surface that is in surface-to-surface contact with a back surface of the area in which the pattern image is formed.

3. The image forming apparatus as defined in claim 1, wherein the endless belt is made of a material selected from the group consisting of PVDF (polyvinylidene fluoride), PI (modified polyimide), PC (polycarbonate), and E/TFE (ethylene/tetrafluoro ethylene copolymer).

4. The image forming apparatus as defined in claim 1, wherein a distance between a detection surface of the pattern image reading means and the pattern image is 20 mm±0.2 mm.

5. The image forming appartus as defined in claim 1, wherein an inclination of the endless belt to a dectection surface of the pattern image reading means is within a range of ±1°.

6. The image forming apparatus as defined in claim 1, wherein a greatest amplitude of the endless belt is not greater than 0.1 mm.

7. The image forming apparatus as defined in claim 1, wherein the back surface contact member is in contact at a plurality of places with a back surface of the area in which the pattern image is formed.

8. The image forming apparatus as defined in claim 7, wherein the back surface contact member is constituted by a plurality of rollers provided so as to be rotatable while being in contact with the back surface of the area in which the pattern image is formed.

9. The image forming apparatus as defined in claim 8, wherein the plurality of rollers are provided at a distance of not greater than 100 mm from each other.

10. The image forming apparatus as defined in claim 8, wherein the plurality of rollers each have a surface that is in contact with the endless belt, the surface being made of a hard, low-friction material.

11. The image forming apparatus as defined in claim 1, further comprising image forming condition control means for controlling conditions for forming an image on a recording medium on which the image is formed.

12. The image forming apparatus as defined in claim 11, wherein the pattern image reading means is constituted by a sensor including:
   a laser source for generating laser light;
   a beam splitter for reflecting the laser light generated by the laser source, and for allowing the laser light reflected at the endless belt to pass therethrough;
   a collimator lens for modifying the laser light reflected at the beam splitter in shape into a complete circle;
   a first lens for focusing the laser light modified by the collimator lens so as to form a tiny spot on the endless belt;
   a second lens for focusing the laser light having passed through the beam splitter; and
   a light receptor element for receiving the laser light focused by the second lens and outputting electric signals to the image forming condition control means according to an amount of light received.

13. The image forming apparatus as defined in claim 1, wherein the reading stabilizing means further includes an energizing member for energizing the back surface contact member toward the pattern image reading means.

14. The image forming apparatus as defined in claim 13, wherein the supporting member is a supporting frame, and the supporting frame engages in elongated holes and energizes the back surface contact member toward the pattern image reading means.

15. The image forming apparatus as defined in claim 1, wherein an increment in tension of the endless belt caused by the pressing of the back surface contact member is within a range of 180 g to 400 g.

16. The image forming apparatus as defined in claim 15, wherein an increment in tension of the endless belt caused by the pressing of the back surface contact member is within a range of 200 g to 400 g.

* * * * *